United States Patent [19]

Acampora et al.

[11] Patent Number: 4,827,336

[45] Date of Patent: May 2, 1989

[54] SYMBOL CODE GENERATION PROCESSING FROM INTERFRAME DPCM OF TDM'D SPATIAL-FREQUENCY ANALYSES OF VIDEO SIGNALS

[75] Inventors: Alfonse A. Acampora, Staten Island, N.Y.; Richard M. Bunting, Robbinsville, N.J.

[73] Assignee: General Electric Company, Schenectady, N.Y.

[21] Appl. No.: 135,184

[22] Filed: Dec. 18, 1987

[51] Int. Cl.$^4$ .................. H04N 7/12; H04N 11/04
[52] U.S. Cl. .................... 358/135; 358/136; 358/13
[58] Field of Search ............ 358/11, 1, 13, 133, 358/135, 136, 138

[56] References Cited

U.S. PATENT DOCUMENTS

| | | | |
|---|---|---|---|
| 4,663,660 | 5/1987 | Fidele et al. | 358/126 |
| 4,674,125 | 6/1987 | Carlson et al. | 382/49 |
| 4,691,233 | 9/1987 | Acampora | 368/136 |

OTHER PUBLICATIONS

"Subband Coding of Images", J. W. Woods et al., IEEE Transactions on Acoustics, Speech, & Signal Processing, vol. ASSP-34, pp. 1278-2388.

"An Efficient Image Representation for Multiscale Analysis", Stephane Mallet, Topical Meeting on Machine Vision, Technical Digest Series 1987, vol. 12 (Optical Society of America) pp. 172-175.

Primary Examiner—James J. Groody
Assistant Examiner—John K. Peng
Attorney, Agent, or Firm—William Squire; James C. Davis, Jr.; Paul R. Webb, II

[57] ABSTRACT

At a sending station in a digital television transmission system embodying the invention, time-division multiplexing either of the spatial-frequency analyses of the video signals from a television camera or of their interframe DPCM responses, both of which have uniform coding rates, is completed prior to symbol coding of interframe DPCM samples. This obviates the problems of time-division multiplexing symbol codes of variable length and of irregular coding rate. Time-division multiplexing is done so as to facilitate symbol coding protocols which include run-length encoding of DPCM samples. At a receiving station in the digital television transmission system time-division demultiplexing takes place after symbol decoding, being done on a per scan line basis.

25 Claims, 9 Drawing Sheets

Fig. 4

| | | |
|---|---|---|
| (8N+1)TH CAMERA 2 SCAN LINE | (4N+1)TH SCAN LINE $Y_{LL}$ | (4N+1)TH SCAN LINE $Y_{LH}$ (N+1)TH SCAN LINE $C_1LL$ |
| (8N+2)TH CAMERA 2 SCAN LINE | (4N+1)TH SCAN LINE $Y_{HL}$ | (4N+1)TH SCAN LINE $Y_{HH}$ (N+1)TH SCAN LINE $C_2LL$ |
| (8N+3)TH CAMERA 2 SCAN LINE | (4N+2)TH SCAN LINE $Y_{LL}$ | (4N+2)TH SCAN LINE $Y_{LH}$ (N+1)TH SCAN LINE $C_1LH$ |
| (8N+4)TH CAMERA 2 SCAN LINE | (4N+2)TH SCAN LINE $Y_{HL}$ | (4N+2)TH SCAN LINE $Y_{HH}$ (N+1)TH SCAN LINE $C_2LH$ |
| (8N+5)TH CAMERA 2 SCAN LINE | (4N+3)TH SCAN LINE $Y_{LL}$ | (4N+3)TH SCAN LINE $Y_{LH}$ (N+1)TH SCAN LINE $C_1HL$ |
| (8N+6)TH CAMERA 2 SCAN LINE | (4N+3)TH SCAN LINE $Y_{HL}$ | (4N+3)TH SCAN LINE $Y_{HH}$ (N+1)TH SCAN LINE $C_2HL$ |
| (8N+7)TH CAMERA 2 SCAN LINE | (4N+4)TH SCAN LINE $Y_{LL}$ | (4N+4)TH SCAN LINE $Y_{LH}$ (N+1)TH SCAN LINE $C_1HH$ |
| (8N+8)TH CAMERA 2 SCAN LINE | (4N+4)TH SCAN LINE $Y_{HL}$ | (4N+4)TH SCAN LINE $Y_{HH}$ (N+1)TH SCAN LINE $C_2HH$ |

4,827,336

SYMBOL CODE GENERATION PROCESSING FROM INTERFRAME DPCM OF TDM'D SPATIAL-FREQUENCY ANALYSES OF VIDEO SIGNALS

The invention relates to televising digitized images.

BACKGROUND OF THE INVENTION

Differential pulse code modulation (DPCM) of digitized video signals is often an important step in the digital transmission of frame sequences of television images. In DPCM each sample descriptive of a picture element ("pixel") in a raster scanning of successive frames is differentially combined with a related picture element and the resulting difference is coded in a pulse coding modulation procedure. DPCM procedures where a pixel is differentially combined with the preceding sample, or a sample one scan line earlier, or some other spatially adjacent sample are known and can be classified as being intraframe DPCM procedures. However DPCM of the "interframe" type where a pixel is differentially combined with the correspondingly located pixel in the previous frame, has particular advantages over intraframe DPCM procedures. If run length coding is done, long runs of zero-value DPCM samples are likely to occur in static portions of a sequence of frames. Quantizing noise is temporal in nature in interframe DPCM rather than being spatial in nature as in intraframe DPCM; and the human visual system is less likely to discern temporal quantizing noise, owing to time-integrating properties in the visual system. Error propagation in interframe DPCM coding tends to affect single pixels; in intraframe DPCM an error may propagate over extensive portions of a frame and be very intrusive insofar as the human visual system is concerned. Interframe DPCM transmission of video signals is sometimes preceded by procedures for selectively filtering the video signals into respective components.

The structure for an interframe digital pulse code modulator is generally as follows. The current video signal or video signal component is digitized to form a stream of digital input samples that is supplied to the minuend input port of a subtractor. The subtrahend input port of the subtractor receives predicted values for the digital input samples, and the difference output port responds to the samples received at its input ports to generate a digital error signal. This digital error signal is supplied to a quantizer, which classifies the digital error signal into range bins. Often the modulator is of a type in which the range of sample values for each bin in the quantizer can be adjusted during operation. The quantizer may define uniform range bins simply by suppressing less significant bits in the error signal or may be of a type defining different size range bins. The quantizer output signal, a stream of range bin numbers symmetrically disposed about zero, is the modulator output signal. The predicted values for the next frame of samples are obtained as follows. Each sample of the modulator output signal comprising a succession of bin numbers is converted to the nominal error signal sample value for that bin number and is added to the predicted value of the current digital input sample to arrive at the predicted value of the digital input sample to occur one frame later. This latter predicted value is then written into a frame store memory to be read a frame later to the subtractor subtrahend input port.

The structure for an interframe digital pulse code demodulator is generally as follows. Each sample of the demodulator input signal, which corresponds to a sample of the modulator output signal described in the previous paragraph, is a bin number which is converted to the nominal error signal value for that bin number and is furnished to a first addend input port of an adder. A second addend port of the adder receives a predicted value, and a digital signal similar to the digital input signal supplied to the digital pulse code modulator is generated at the sum output port of the adder. This digital signal is written into a frame store memory to be read a frame later to the second addend port of the adder as a predicted value.

N. J. Fedele, A. Acampora, P. J. Burt and R. Hingorani in U.S. Pat. No. 4,663,660 issued May 5, 1987 and entitled "COMPRESSED QUANTIZED IMAGE-DATA TRANSMISSION TECHNIQUE SUITABLE FOR USE IN TELECONFERENCING" describe spatial frequency analysis of television images being done on a per octave basis within the confines of an interframe DPCM feedback loop. The spatial frequency analysis results are individually quantized and symbol coded in respective circuitry, and the symbol codes are time-division multiplexed (TDM'd) for transmission over a digital link having narrow bandwidth compared to digital links that would be required for transmitting digitized video samples. The symbol coding technique described by Fedele et al. uses statistical coding, such as Huffman coding, of DPCM samples with non-zero values and of run-lengths for zero-value DPCM samples.

L. N. Schiff in U.S. patent application Ser. No. 040,470 filed Apr. 17, 1987, assigned to RCA Corporation and entitled "TWO RESOLUTION LEVEL DPCM SYSTEM" describes spatial frequency analysis of television images being followed by respective differential pulse code modulators for each analysis result. The DPCM signals are individually symbol coded, and the symbol codes are TDM'd for transmission over a narrow bandwidth digital link.

The problem with the systems described above is that the time-division multiplexing of the symbol code is complex since the rates of the symbol codes being multiplexed are non-uniform. Further, these systems are unduly complex in structure, each requiring a plurality of symbol encoders, for example.

SUMMARY OF THE INVENTION

At a sending station in a digital television transmission system embodying the invention, time-division multiplexing either of the spatial-frequency analyses of the video signals from a television camera or of their interframe DPCM responses, both of which have uniform coding rates, is completed prior to symbol coding of interframe DPCM samples. This obviates the problems of time-division multiplexing symbol codes of variable length and of irregular coding rate. Time-division multiplexing is done so as to facilitate symbol coding protocols which include run-length encoding of DPCM samples. At a receiving station in the digital television transmission system time-division demultiplexing takes place after symbol decoding, being done on a per scan line basis.

BRIEF DESCRIPTION OF THE DRAWING

FIG. 4 is a timing diagram showing how timedivision multiplexing of video signal subbands may be accomplished in the FIG. 2 coder.

Figure 1:
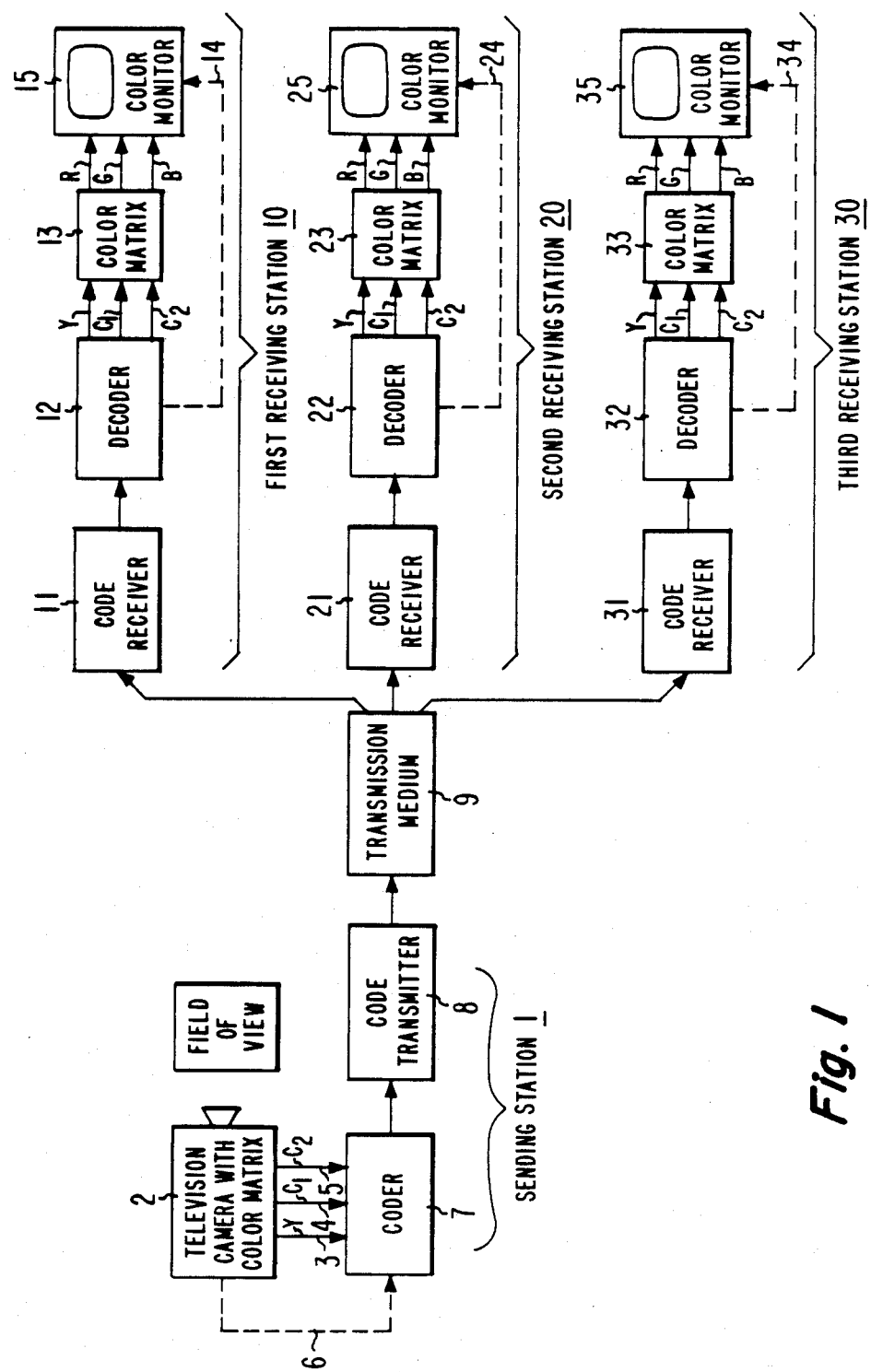
FIG. 1 is a block diagram of a digital television transmission system, as may embody the invention.

The convention of showing control signal connections as dashed lines is followed in the block diagrams in the drawing.

DETAILED DESCRIPTION

In FIG. 1, at a sending station 1 comprising elements 2–8, visible light radiation from a field of view is sensed by a television camera 2. Television camera 2 is shown as being a color television camera, which subjects an optical image of the field-of-view to color selective filtering and subsequent photosensing to develop at least three video signals. These color signals are electronically combined in color matrix circuitry within television camera 2 to develop a relatively wideband luminance signal Y and two relatively narrowband chrominance signals $C_1$ and $C_2$. $C_1$ and $C_2$ may be descriptive of color-differences from Y; or $C_1$ and $C_2$ may be descriptive of the narrowband luminance values of two of the additive primary colors, such as red and blue. The raster-scanned analog Y, $C_1$ and $C_2$ signals are supplied via connections 3, 4 and 5 to a coder 7. Coder 7 also receives synchronization or timing signals from television camera 2 via a connection 6.

Coder 7 includes analog-to-digital conversion circuitry for sampling the Y, $C_1$ and $C_2$ signals and for digitizing the samples. Coder 7 encodes the digitized Y, $C_1$ and $C_2$ signals employing digital compression techniques. The digital codes generated by coder 7 are supplied to a code transmitter 8 which transmits the digital codes via a transmission medium 9. Code transmitter 8 might, for example, be a phase-shift keying r-f transmitter for transmitting via a satellite link used as transmission medium 9.

FIG. 1 shows the sending station 1 transmitting via transmission medium 9 to a first receiving station 10 comprising elements 11–15. In receiving station 10 a code receiver 11 is used to recover from transmission medium 9 digital codes similar to those generated by coder 7, which recovered digital codes are forwarded to a decoder 12. Decoder 12 undoes the digital compression introduced by coder 7 and performs the digital-to-analog conversion necessary to regenerate analog Y, $C_1$ and $C_2$ signals. Color matrixing circuitry 13 electronically combines the Y, $C_1$ and $C_2$ signals to develop red (R), blue (B) and green (G) signals. These R, G and B signals and timing signals supplied from decoder 12 via a connection 14 are applied to a color television monitor 15 which displays an image on its viewing screen similar to the field of view that television camera 2 senses.

Television camera 2, coder 7 and code transmitter 8 may transmit code to other receiving stations besides receiving station 10—for example, on a broadcast basis. FIG. 1 shows a second receiving station 20 comprising elements 21–25 analogous to elements 11–15, and a third receiving station 30 comprising elements 31–35 analogous to elements 11–15. Each of the receiving stations 10, 20, 30 may be provided with its own transmitting apparatus analogous to elements 2–8, and the sending station 1 may also comprise receiving apparatus analogous to elements 11–15. This will provide for two-way communication between each station, as is generally desired in video teleconferencing. Of particular interest insofar as the invention is concerned are the forms coder 7 may take and the forms decoder 12 and its likes 22 and 32 may take.

Figure 2:
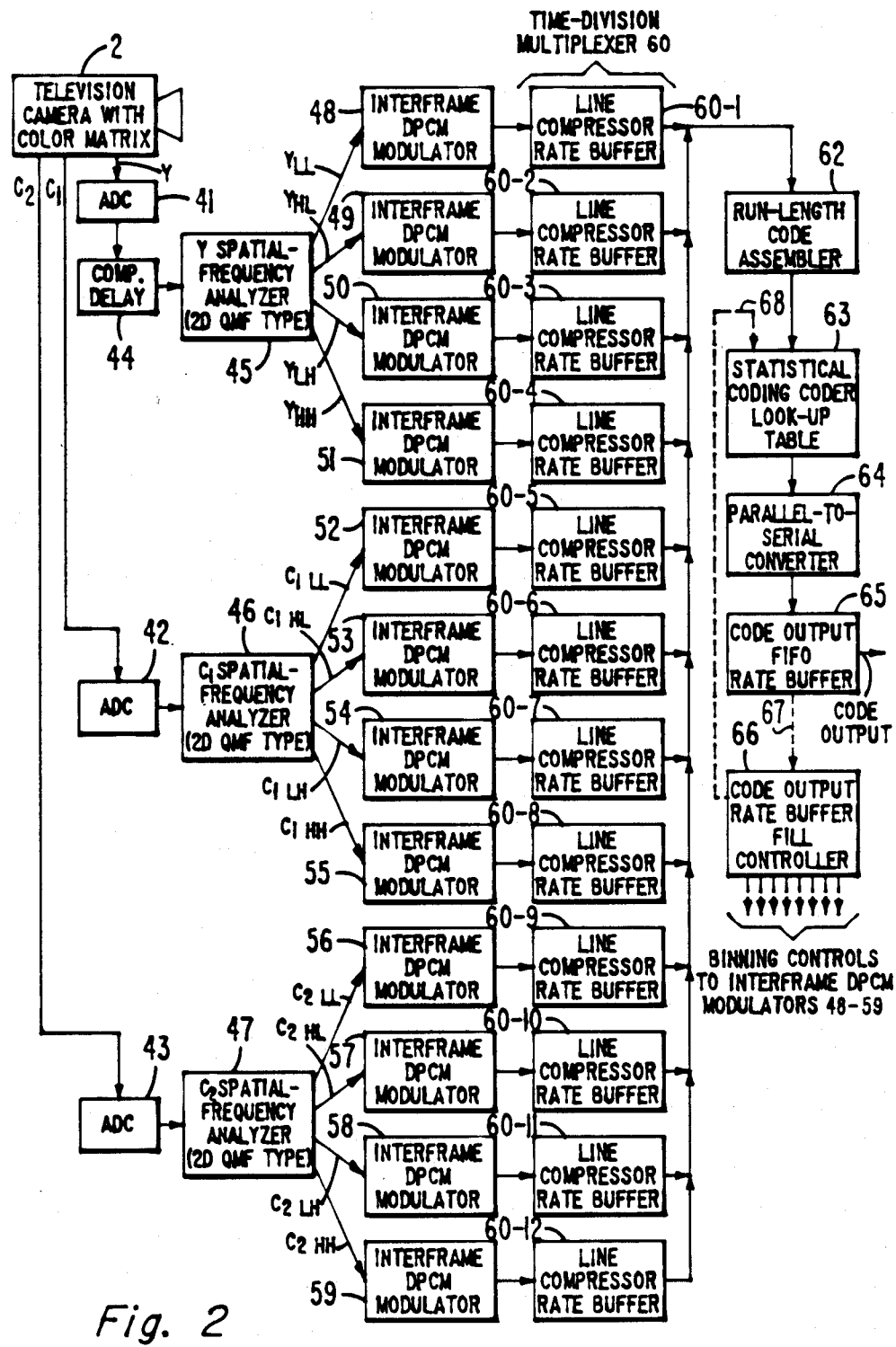
FIG. 2 is a block diagram of a coder for a sending station of the FIG. 1 system, which coder embodies an aspect of the invention.

FIG. 2 shows one form coder 7 may take. Television camera 2 supplies Y, $C_1$ and $C_2$ analog video signals to analog-to-digital converters 41, 42 and 43 respectively. Line scan rate and the number of samples converters 41, 42 and 43 take per line are optimally chosen such that the sample rate is about twice the Nyquist Criteria in each direction, which may require some prefiltering in the spatial-frequency domain. To an extent this may be done optically in the lens assembly of camera 2, but the prefiltering can be augmented by electrical filtering. Such electrical filtering should be done within the analog domain before analog-to-digital converters 41–43. Electrical filtering is done on a separable basis, filtering in the horizontal direction being straightforward to do. In the vertical direction, perpendicular to scan lines, transverse filtering can be done in the analog domain by wobbling scan line positioning in camera 2. The relatively narrowband $C_1$ and $C_2$ signals preferably are sampled at lower sampling rates than the relatively wideband Y signal, and it is convenient to choose these lower sampling rates as submultiple to Y sampling rate. It is particularly convenient to use subsampling rates that are $2^{-n}$ submultiples of the sampling rate of Y, where n is a positive integer in each case. The integer n can be chosen to be one, two, three, or four. Whether $C_1$ and $C_2$ are R-Y and B-Y respectively as in European television broadcasting, whether $C_1$ and $C_2$ are I and Q respectively as in American television broadcasting, or whether $C_1$ and $C_2$ are narrowband R and B, n being two provides satisfactorily dense sampling of the $C_1$ and $C_2$ signals if Y sampling density be sufficient. To make n three, it is preferable from an image quality standpoint to alternate the spatial phasing of $C_1$ and $C_2$ subsampling periodicity respective to Y sampling periodicity from frame to frame, which phase alternation complicates the calculation of DPCM samples slightly since spatial interpolation procedures are needed to provide for spatial alignment of samples one frame different in time. Where n is four, phase alternation to provide frame-to-frame chrominance interlace is essential to satisfactory image quality.

Sampling each of the Y, $C_1$ and $C_2$ analog video signals at least twice Nyquist rate in each direction, (as known to the inventors from a co-worker, Dr. E. H. Adelson) accommodates quantization of signal amplitudes in the digital processing, without aliasing effects owing to undersampling becoming too apparent. While more picture-element samples are used for a given amount of spatial resolution in a static image, runs of zero-value DPCM samples based on those picture-element samples are likely to be longer; and, where run-length coding is employed, the increased number of picture element samples causes much more moderate increase in the length of statistical codes based on nonzero-value DPCM samples and runs of zero-value DPCM samples.

The wideband digitized Y signal from analog-to-digital converter 41 is applied to the input port of a digital delay line 44, which compensates for delays that occur in the processing of the narrowband $C_1$ and $C_2$ signals through the overall system. Digital delay line 44 may comprise a random access memory with offset read and write addresses, for example. Delay in the $C_1$ and $C_2$ signals occurs in the spatial-frequency filtering of these signals to narrowed bandwidths, particularly in the direction perpendicular to scan lines, but further delays occur in the time-division multiplexing of the spatial frequency analyses of the $C_1$ and $C_2$ signals, which multiplexing is described further on in this specification.

The digitized Y, $C_1$ and $C_2$ signal from digital delay line 44, from analog-to-digital converter 42 and from analog-to-digital converter 43, respectively, are applied as input signals to spatial-frequency analyzers 45, 46 and 47 respectively. Pipeline spatial frequency analyzers of the so-called "Burt Pyramid" type, which provide two-dimensional spatial-frequency analyses in octave bandwidths, are known from U.S. Pat. No. 4,674,125 issued June 16, 1987 to C. R. Carlson, J. H. Arbeiter, and R. F. Bessler, entitled "REAL TIME HIERARCHAL PYRAMID SIGNAL APPARATUS" and assigned to RCA Corporation. Spatial frequency analyses of the so-called "Anderson FSD Pyramid" type are described by C. H. Anderson in his U.S. Pat. No. 4,718,104 issued Jan. 5, 1988, entitled "A FILTER-SUBTRACT-DECIMATE HIERARCHAL PYRAMID SIGNAL ANALYZING AND SYNTHESIZING TECHNIQUE" and assigned to RCA Corporation. L. N. Schiff in U. S. patent application Ser. No. 040,470 describes spatial analyzers that simply separate upper and lower spatial-frequency spectra in the direction parallel to scan lines—i.e. the horizontal direction in most applications. While spatial-frequency analyzers of any of the foregoing types may be employed in various embodiments of the invention, spatial-frequency analyzers 45, 46 and 47 are shown as being of the type which use quadrature mirror filters to separate an input signal into four sub-bands, which are decimated 2:1 in each spatial direction. The reader is referred to the paper "Subband Coding of Images" by J. W. Woods and S. D. O'Neil appearing on pp 1278-2388 of the October 1986 IEEE TRANSACTIONS ON ACOUSTICS, SPEECH AND SIGNAL PROCESSING, Vol ASSP-34.

Sampling of at least twice Nyquist rate reduces the sensitivity of filter response to the spatial phasing of edges and details, thereby eliminating a principal source of aliasing on moving edges and details. Where high-pass spatial-frequency filter responses are to be heterodyned to baseband in spatial-frequency analysis procedures, it is preferable to do this filtering as band-pass spatial-frequency filtering to avoid aliasing in the heterodyning procedure. Band-pass spatial filtering suppresses above-band responses introduced by quantizing effects attendant to the digitization of signals, as would undesirably cause aliasing effects. Prefiltering of camera video signals before spatial frequency analysis also is done to prevent above-band responses that give rise to aliasing, particularly if high-pass filter responses are heterodyned to baseband. The quadrature mirror filtering followed by decimation procedures rely on heterodyning to baseband.

Spatial frequency analyzer 45 separably spatial-frequency filters the Y signal into half-band upper and lower spectra in a first direction, using a first pair of quadrature mirror filters, then filters each of these half-band spectra into component upper and lower spectra in a second direction orthogonal to the first. This filtering to obtain quarter-band spectra is assumed to be done on a pipeline basis. One of the first and second directions parallels scan lines in the raster-scanned Y signal; and the other of the first and second directions is transverse to the scan lines. It is preferable to use quadrature mirror filter pairs with odd symmetry in their respective dimension and to decimate the component spectra each 2:1 in spatial anti-phase in each dimension. Alternatively, equivalent non-separable quadrature mirror filtering may be used. During every other scan line in its Y input signal spatial frequency analyzer 45 supplies to an interframe DPCM modulator 48 a signal $Y_{LL}$, which is a spatial-frequency filter response that is low-pass in nature in both horizontal and vertical directions, and which has half so many samples per scan line as Y. During these same alternate scan lines of Y signal, spatial frequency analyzer 45 supplies to an interframe DPCM modulator 49 a signal $Y_{HL}$, which is a spatial-frequency filter response that is low-pass in nature in the vertical direction but is high-pass in nature in the horizontal direction, which has half so many samples per scan line as Y, and which is time interleaved on a per-picture-element basis with $Y_{LL}$. Frequency analyzer 45 supplies samples of a $Y_{LH}$ signal and of a $Y_{HH}$ signal to DPCM modulators 50 and 51, respectively, during the alternate Y signal scan lines. These alternate signal scan lines interleave with the Y signal scan lines during which the frequency analyzer 45 supplies samples of the $Y_{LL}$ and $Y_{HL}$ signals. The $Y_{LH}$ and $Y_{HH}$ signals are spatial-frequency filter responses that are both high-pass in nature in the vertical direction. $Y_{LH}$ is low-pass in nature in the horizontal direction, and $Y_{HH}$ is high-pass in nature in the horizontal direction. $Y_{LH}$ and $Y_{HH}$ each have half the number of samples per scan line as Y signal has, and they are time-interleaved with each other on a per-picture-element basis. The total number of samples per frame in the $Y_{LL}$, $Y_{HL}$, $Y_{LH}$ and $Y_{HH}$ signals equals the number of samples per frame in the Y signal.

The fact that $Y_{HL}$, $Y_{LH}$ and $Y_{HH}$ have only three quarters the number of samples as Y per frame is one reason two-dimensional quadrature mirror filtering is preferred over other one-decimation-step subband coding techniques of types which separate Y into a $Y_{LL}$ low-pass component with one quarter the number of samples per frame as Y and a conglomerate complementary high-pass component with the same number of samples per frame as Y. Further, the $Y_{HL}$, $Y_{LH}$ and $Y_{HH}$ signals tend to have longer zero-value runs in them than the conglomerate high-pass component of Y.

The spatial-frequency analysis into four sub-spectra $Y_{LL}$, $Y_{HL}$, $Y_{LH}$ and $Y_{HH}$ by spatial-frequency analyzer 45 has analogies in the spatial-frequency analyses of $C_1$ and $C_2$ performed by spatial-frequency analyzers 46 and 47, respectively. $C_1$ is analyzed in spatial-frequency analyzer 46 to generate a $C_{1LL}$ signal, which is low-pass in nature in both the horizontal and vertical directions and is supplied as input signal to DPCM modulator 52; a $C_{1HL}$ signal, which is high-pass in the horizontal direction and low-pass in the vertical direction and is supplied as input signal to DPCM modulator 53; a $C_{1LH}$ signal, which is low-pass in the horizontal direction and high-pass in the vertical direction and is supplied as input signal to DPCM modulator 54; and a $C_{1HH}$ signal which is high-pass in both horizontal and vertical directions and is supplied as input signal to DPCM modulator 55. $C_2$ is analyzed in spatial-frequency analyzer 47 to generate $C_{2LL}$, $C_{2HL}$, $C_{2LH}$ and $C_{2HH}$ signals supplied as input signals to DPCM modulators 56, 57, 58 and 59, respectively. The spatial-frequency analysis results from analyzers 46 and 47 issue at reduced rate respective to the spatial-frequency analysis result from analyzer 45, which reductions are by the same factors as govern the sampling rates of $C_1$ and $C_2$ vis-a-vis the sampling rate of Y.

The DPCM signals generated by modulators 48-59 are the input for a time-division multiplexer 60 which interleaves them on a per scan line basis to supply a continuous sample stream as input signal to a run-length code assembler 62. Assembler 62 detects zero-value samples and counts run lengths of such samples. These run lengths of zero-valued samples are converted to a range of values beyond the non-zero values in the input signal supplied to assembler 62 and are substituted for the zero-value samples per se in the sample stream supplied as addresses to a statistical coding coder look-up table 63. LUT 63 can be realized in most part by code book storage in a read-only memory (ROM) or its like.

By way of example, the codes in coder table 63 may be Huffman codes for non-zero values, more frequently occurring zero-value run lengths, and a code-switching flag used to generate a prefix code indicative that unusual run lengths of zero values are to be specified in straightforward binary coding terms. The use of the prefix code and binary coding of unusual run lengths of zero values keeps the size of the coder table 63 ROM within reasonable bounds. The codes from table 63 are of various bit lengths and are supplied to a parallel-to-serial converter 64, which applies the bits in these codes serially to a code output rate buffer 65. Rate buffer 65 is of first-in, first-out (FIFO) type.

These bits are serially supplied to code output rate buffer 65 at irregularly occurring time periods, not only because of the various bit lengths of table 63 output codes, but also because of irregularities of timing introduced by the run-length encoding process. Despite the irregularity of occurrence of these time periods, the ordering of the serial bits is invariably correct because the time-division multiplexing of $Y_{LL}$, $Y_{HL}$, $Y_{LH}$, $Y_{HH}$, $C_{1LL}$, $C_{1HL}$, $C_{1LH}$, $C_{1HH}$, $C_{2LL}$, $C_{2HL}$, $C_{2LH}$ and $C_{2HH}$ is accomplished by multiplexer 60 before any of the processing introducing irregularity of timing. All the irregularities of timing do is to introduce gaps in the code stream supplied to code output rate buffer 65. Code output rate buffer 65 retimes the bits so as to eliminate these gaps, or at least many of them, to provide further time compression of the digital transmission by the code transmitter receptive of the code output from rate buffer 65.

Output code rate buffer 65 must have sufficient storage capacity to accommodate the large numbers of bits that come in during processing of a frame exhibiting great changes from the previous frame, as occurs in a frame with a large amount of motion in it. In a system like that shown in FIG. 2, in which elements 62-65 are not within a DPCM loop, the rate buffer 65 storage capacity can be appreciably more than one average-case frame—up to a few worst-case frames if economics permit. In such cases one may choose not to use an adaptive coding system that modifies coding procedure when there is an unusually high bit rate for protracted periods of time. With such a design choice there will be no fill controller 66 for the output code rate buffer 65. This approach, using a large code output rate buffer to avoid having to have a fill controller for the rate buffer, may be satisfactory for a one-way video transmission system. But in a two-way video transmission system—i.e., teleconferencing—the delay introduced by a large code output rate buffer in the sending station and its complementary code input rate buffer at the receiving station may be unacceptable, particularly when that delay augments other substantial transmission delays—for example, those arising from transmission via a satellite link. These delays can be made somewhat less objectionable by suitably delaying attendant audio transmissions to match video delay. However, delays of a tenth second or more are objectionable because speakers begin to have to speak on cue, rather than being able to participate in the give and take of normal conversation.

It is generally desirable to control the filling of the code output rate buffer 65 with a controller 66 that modifies coding procedures during high-motion frames to reduce the bit rate into rate buffer 65. This reduces the storage requirements for rate buffer 65 and its complementary rate buffer at the receiving station and also reduces the delays introduced by these rate buffers. Rate buffer 65 may take a form where its serial bit input is collected into uniform-bit-length words which are then stored in a random-access memory (RAM) therein, each successive word being stored in the word storage location with next higher write address in a modular arithmetic. At the same time the RAM is being read from at regular word rate with a regular scanning of the successive read addresses of word locations in the RAM, and the words from RAM are being converted back to serial form by a parallel-to-serial converter internal to the rate buffer 65, thereby to generate uniform-rate serial output code. As long as rate buffer 65 is not overfilled (or underfilled) the read addresses will lag the write addresses in varying amount, and the difference between the RAM write and read addresses will be an indication of the amount of storage room left in the RAM. This indication is supplied by rate buffer 65 to the fill controller 66 via a connection 67. The function of fill controller 66 is to adjust the coding scheme to keep rate buffer 65 reasonably close to empty most of the time, so the capability to accommodate high-motion frames is not compromised or at least not usually so. There are a number of ways fill controller 66 can carry out its function.

For example, if there is a problem with code output rate buffer 65 exhibiting a tendency to overfill, fill controller 66 can be arranged to send control signals to the interframe DPCM modulators 48-59 to coarsen the binning in their respective quantizer elements. Particularly, the zero-value bin is widened to make long runs of zero-value samples more likely in the scan line outputs of DPCM modulators 48-59. Change in the bin widths of the quantizer elements in DPCM modulators 48-59 may be accompanied by fill controller 66 sending signal via a connection 68 to coder LUT 63 to adjust its coding table to better fit the statistics of the altered DPCM signal. Adjustment of the coding table is most easily done by selecting a different coder table from ROM.

In two-way digital video transmission systems, where the desire is to avoid the frame of delay associated with look-ahead techniques for interframe DPCM, coarsening the binning in the interframe DPCM modulators 48-59 allows rapid response to rate buffer 65 overfilling. An intraframe correction can be quickly made (e.g.

between blocks of image information) that does not disrupt the operation of the spatial-frequency interpolators at the receiving station. The sending station may insert a code word indicating the nature of the binning change into the data stream supplied from the FIG. 2 coder to the code transmitter, the insertion being done at the appropriate interval between blocks of image information, so that the decoder at the receiver can respond to change in decoder look up tables.

Another way that can be used for avoiding overflowing the code output rate buffer 65 takes advantage of the known fact that, in areas where motion occurs in a sequence of image frames, higher spatial frequencies are not resolved as well either spatially or temporally as lower spatial frequencies. One arranges during frames with larger numbers of non-zero DPCM values, as would overfill code output rate buffer 65, to suppress the transmission of higher spatial-frequency components of the Y video signal and possibly of the $C_1$ and $C_2$ video signals as well. The mechanisms for doing this are not shown explicitly in FIG. 2, since this procedure is ancillary to the invention claimed hereinafter, but these mechanisms operate as follows.

When an overflow condition in output rate buffer 65 is predicted, the predicted values of $Y_{HL}$, $Y_{LH}$ and $Y_{HH}$ in interframe DPCM modulators 49, 50 and 51 (and possibly of $C_{1HL}$, $C_{1LH}$, $C_{1HH}$, $C_{2HL}$, $C_{2LH}$ and $C_{2HH}$ in interframe DPCM modulators 53, 54, 55, 57, 58 and 59 as well) are forced to zero. The output signals from the affected DPCM modulators are also forced to zero. This is done by suitable multiplexing arrangements in the DPCM modulators. A digital codeword indicative of this operation occurring is inserted into the input signal to the coder look-up table 63 during a time interval between frames (or between blocks of image data), to signal the receiving station of these actions taken at the sending station. The receiving station can then force to zero predicted values of $Y_{HL}$, $Y_{LH}$, $Y_{HH}$ and possibly $C_{1HL}$, $C_{1LH}$, $C_{1HH}$, $C_{2HL}$, $C_{2LH}$ and $C_{2HH}$ as well) in its DPCM demodulation circuitry and substitute zeros at the appropriate places in the signals supplied to its Y, $C_1$ and $C_2$ spatial-frequency synthesizers used to regenerate Y, $C_1$ and $C_2$ video signals. One should note that the zero-stuffing procedures described in this paragraph (which are of the type described by L. N. Schiff in his U.S. patent application Ser. No. 040,470) reduce the spatial resolution of the image. However, the zero-stuffing procedures remove higher-spatial-frequency information in the predicted image, avoiding an aliasing that is very apparent to the human visual system. This aliasing shows up as a "ghost edge". With zero-stuffing, aliasing does not occur in the spatial domain, where it is very apparent to the human visual system. Rather, there is temporary reduction of bandwidth, which is not as noticeable and is corrected with time.

Figure 3:
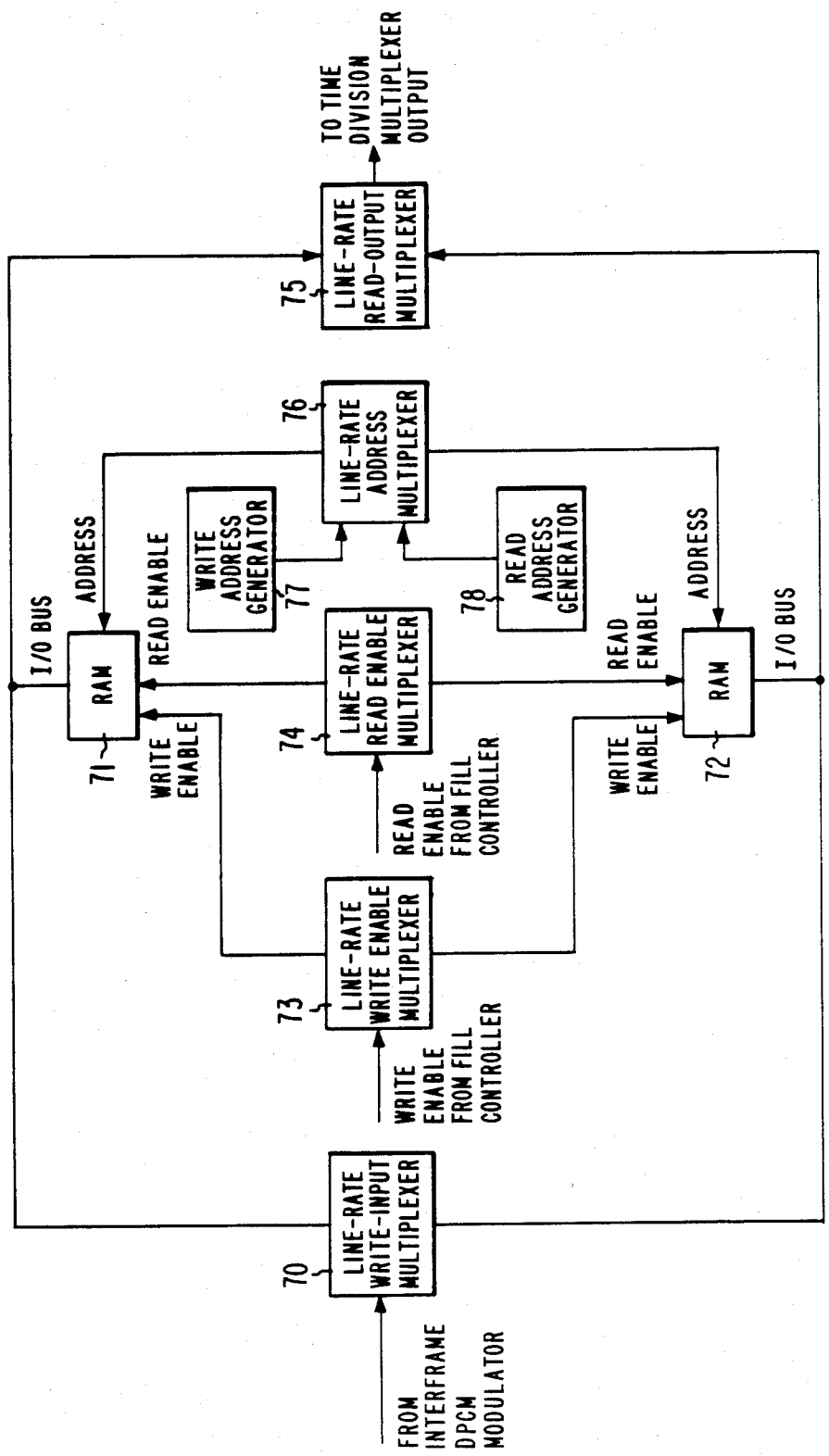
FIG. 3 is a block diagram of a rate buffer operable as a line compressor or as a line expander.

FIG. 3 shows how each of the line-compressor rate buffers in time-division multiplexer 60—e.g. rate buffer 60-1—can be constructed. Assume the successive scan lines of the spatial-frequency analysis supplied as input signal to the FIG. 3 line-compressor rate buffer are consecutively ordinally numbered beginning at one using modulo-number-of-scan-lines-per-frame arithmetic. A line-rate write-input multiplexer 70 directs odd-numbered scan lines of the spatial-frequency analysis to the input/output bus of a random access memory 71 for writing thereto, and directs even-numbered scan lines to the input/output bus of a random access memory 72 for writing thereto. RAMs 71 and 72 each have storage capacity for a scan line of samples. Any WRITE ENABLE signal pulses are directed by a line-rate write enable multiplexer 73 to the one of RAMs 71 and 72 being written that scan line, and any READ ENABLE signal pulses are directed by a line-rate read-enable multiplexer 74 to the other of RAMs 71 and 72 during that scan line. A line-rate read-output multiplexer 75 connects the input/output bus of the one of RAMs 71 and 72 selected for reading and not selected for writing to the output connection of the FIG. 3 line-compressor rate buffer. A line-rate address multiplexer 76 connects a write address generator 77 to the one of RAMs 71 and 72 enabled for writing and a read address generator 78 to the one of RAMs 71 and 72 enabled for reading. Write address generator 77 and read address generator 78 are each scanning address generators which generate the successive addresses of pixel samples along a scan line, though the rates at which the successive addresses are scanned are different for the two address generators. The write address generator 77 can be shared with other line-compressor rate buffers operated at the same sampling rates, if time-division multiplexing permits, as it does in the FIG. 2 coder. The respective WRITE ENABLE signals received by the rate buffers from fill controller 66 control the time-division multiplexing insofar as writing to their RAMs is concerned. Theread address generator 78 can be shared with other line-compressor rate buffers operated at the same sampling rates, if time-division multiplexing permits, as it does in the FIG. 2 coder. The respective READ ENABLE signals received by the rate buffers from fill controller 66 control the time-division multiplexing insofar as reading from their RAMs is concerned. The FIG. 3 hardware functions as a line-compressor rate buffer, owing to the rate at which read addresses are intermittently supplied read address generator 78 being faster than the rate at which write addresses are intermittently supplied by write generator 77, and owing to commensurate differences in WRITE ENABLE and READ ENABLE pulse rates. Samples written into one of the RAMs 71 and 72 during one scan line of a spatial-frequency analysis are subsequently read out in half a scan line. The FIG. 3 hardware may alternatively be used to provide for line-expander rate buffering by making the rate at which read addresses are intermittently supplied by read address generator 78 slower than the rate at which write addresses are intermittently supplied by write address generator 77.

FIG. 4 is a timing diagram of how time-division multiplexer 60 can be operated, which also is helpful in understanding how fill controller 66 operates in the FIG. 2 coder. Line advance in the scan lines from camera 2 is plotted vertically, there being eight lines in a cycle of time-division multiplexer operation that is continuously repeated through the image-bearing portions of a frame, the cycle number N being zero on the first cycle and incrementing by one each successive cycle. A 240-line frame will have 30 cycles of the time-division-multiplexer operation diagrammed in FIG. 4 with N incrementing from zero to twenty-nine on successive ones of these cycles. Time during a scan line of video from camera 2 is plotted horizontally—e.g. during the $(8N+1)^{th}$ line a compressed scan line of $Y_{LL}$ samples is followed by a compressed scan line of $Y_{LH}$ samples. $C_1$ and $C_2$ are each shown as being subsampled 4:1 respective to Y in both the horizontal and vertical directions, which provides for a simple packing format in timedivision multiplexer 60 output signal to run-length code assembler 62.

If the rate buffer begins to fill up too much scan lines of $C_{2HH}$, $C_{1HH}$ and $Y_{HH}$ samples are replaced by scan lines of zero values, altogether if the fill rate is high, or selectively if the fill rate is sufficiently low. If the rate buffer continues filling up more, or if the fill rate is quite high, scan lines of $C_{2HL}$, $C_{1HL}$, and $Y_{HL}$ samples can also be replaced by scan lines of zero values. If the rate buffer continues filling up more, or if the fill rate is very high, scan lines of $C_{2LH}$, $C_{1LH}$ and $Y_{LH}$ samples can also be replaced by scan lines of zero values. The run-length code assembler 62 responds to each scan line of zero values to furnish coder LUT 63 an address that selects a short-bit-length statistical code output signal to parallel-to-serial converter 64. The reduction in overall code length of these frequently appearing short-bit-length statistical codes substantially reduces the rate of filling the code output rate buffer 65.

The measures described in the preceding paragraph could reduce fill rate of rate buffer 65 almost four times were zero-value sample runs about the same in various spatial-frequency subbands of a signal. QMF spatial-frequency analyses that divide a signal into more than four subbands will allow greater reduction in rate buffer 65 fill rate and will offer finer tuning of fill control. Further subband coding of the Y signal may particularly be of interest, owing to Y having so much greater sample density than $C_1$ and $C_2$.

One may note that the omission of Y samples has a more rapid effect on reducing the overfilling of the rate buffer 65 than the omission of the more sparsely taken $C_1$ and $C_2$ samples has. Design variations are possible where only Y spatial resolution is reduced to control the filling of rate buffer 65, at least down to where subsampled Y is of the same sampling density as $C_1$ and $C_2$.

If there is still a problem with code output rate buffer 65 exhibiting a tendency to overfill despite all samples except those of $Y_{LL}$, $C_{1LL}$ and $C_{2LL}$ being replaced by zero values, arrangement can be provided to further reduce the spatial resolution in these signals through low-pass spatial filtering followed by further subsampling. This, in accordance with A. A. Acampora's teaching in U.S. Pat. No. 4,700,226 issued Oct. 13, 1987, entitled "RATE BUFFER CONTROL OF PREDICTED SIGNAL DECIMATION AND INTERPOLATION FOR ADAPTIVE PULSE CODE MODULATOR" and assigned to RCA Corporation. Such arrangement can be instead of or in addition to changing the binning in the quantizer elements of DPCM modulators 48–59.

Where further reduction in image resolution need to be done at times, a convenient way to facilitate the procedure is to use further quadrature mirror filtering to subdivide each of the $Y_{LL}$, $C_{1LL}$ and $C_{2LL}$ quarter-spectra into a respective set of four one-sixteenth spectra which are each decimated 2:1 in each spatial direction. Each of these one-sixteenth spectra is provided with a respective interframe DPCM modulator. Multiplexer 60 is modified to replace the rate buffers for the $Y_{LL}$, $C_{1LL}$ and $C_{2LL}$ each with four respective rate buffers compressing the scan lines an additional 4:1 factor in time and delaying them suitably for time-division multiplexing. Then if a high degree of motion in the sequence of image frames being transmitted requires further curtailment of transmission beyond that where only $Y_{LL}$, $C_{1LL}$ and $C_{2LL}$ are transmitted, the higher-spatial-frequency one-sixteenth spectra can have their samples replaced by scan lines of zeros to implement a still further compressed transmission. Appropriate zero-stuffing measures are taken in the interframe DPCM modulators so old higher-spatial-frequency information is discarded in areas of motion, following the principles previously described. Delay compensation of the quarter-spectra that are not subdivided has to be provided, of course, or alternatively one may arrange to subdivide all of the quarter spectra to avoid differential time delay problems altogether.

The description of the FIG. 2 coder omits some important considerations for the design of a transmitting station. Provisions must be made for transmitting video synchronization information and zero-stuffing instructions for the receiving station, and usually there must be some provision for concurrent transmission of sound. A simple design procedure is as follows. One arranges to time-division-multiplex beginning-of-frame and end-of-frame codes into the input of coder look-up table 63. If intraframe synchronization (such as change-of-scan line code set) is to be employed, the intraframe synchronization symbols can be time-division-multiplexed into the input of coder look-up table 63 between compressed scan lines. One arranges for there being sufficient room in the output code rate buffer 65 at the conclusion of each frame of DPCM samples having been coded to time-division multiplex bit stream segments descriptive of sound into the bit stream fed into rate buffer 65, before time-division-multiplexer 60 starts to supply the next frame of DPCM samples. It is preferable practice not to admix sound (or over many intraframe synchronization symbols) within the video-frame time slots, since avoiding this practice better concatenates zero-value run lengths between the $Y_{LL}$, $Y_{HL}$, $Y_{LH}$, $Y_{HH}$, $C_{1LL}$, $C_{1HL}$, $C_{1LH}$, $C_{1HH}$, $C_{2LL}$, $C_{2HL}$, $C_{2LH}$ and $C_{2HH}$ segments of assembler 62 input signal.

One should appreciate that each successive frame that is DPCM coded in the FIG. 2 coder is not a raster-scanned single video signal descriptive of a component of image. Rather each successive frame comprises successive blocks of packed image data, each successive block of which describes all components of an image (in each of its component primary colors) over a number of raster scan lines. A criterion for packing of image data is to keep low the number of raster scan lines described per block of packed image data. This reduces the amount of rate buffering and differential delay required in the time-division multiplexing to pack image data. Quadrature mirror filtering followed by decimation lends itself particularly well to image packing. The total number of narrowband color samples in $C_1$ and $C_2$ is about one-eighth the number of wideband luminance samples in Y so they can be packed in over a few scan lines during line retrace intervals for the television camera 2. The spatial-frequency analyses never generate more or fewer samples than there were in the original video signal (though continuing spatial-frequency analysis procedures incur increasing delays). Therefore packed image data blocks continue to have a general spatial correspondence or mapping to the areas of pixels in the original images from which these data are derived.

One skilled in the art of digital systems design will appreciate there are certain modifications that can be made to the FIG. 2 coder which are within the spirit of the invention. FIG. 2 shows DPCM generation using modulators 48–59 before line compressor rate buffers 60-1, ... 60-12, which reduces the sample rates at which the modulators 48-59 must operate. Alternatively, one can arrange for spatial-frequency analyzers 45, 46 and 47 to apply their analysis results directly as input signals to the line compressor rate buffers 60-1, ... 60-12, with a respective interframe DPCM modulator operative at faster sample rate being inserted in the output connection of each of the line-compressor rate buffers 60-1, ... 60-12 to the input signal bus of run-length code assembler 62.

The particular time-division multiplexing scheme diagrammed in FIG. 4 is attractive in that all the differential delay of the signals being multiplexed is achieved using line-compressor rate buffers as shown in FIG. 3, without need for further delay lines (except the compensating delay line 44, of course). If one is willing to use a more complex differential delaying of the signals being time-division multiplexed, a great variety of alternative time-division multiplexing schemes are possible without departing from the spirit of the invention. Some of these alternatives offer certain operating advantages in exchange for the more complex hardware involved. For example, continuing to suppose a block of image data to be time-division multiplexed on a per (compressed) scan line basis describes eight scan lines of camera 2 video signals, the FIG. 4 multiplexing scheme could be modified to concatenate the four compressed scan lines of $Y_{LL}$, the compressed scan line of $C_{1LL}$ and the compressed scan line of $C_{2LL}$. Similar concatenations could be made of the LH, HL and HH spectra as done with the LL spectra. This could simplify the generation of control signals by the controllers for the FIFO rate buffers handling symbol codes.

Figure 5:
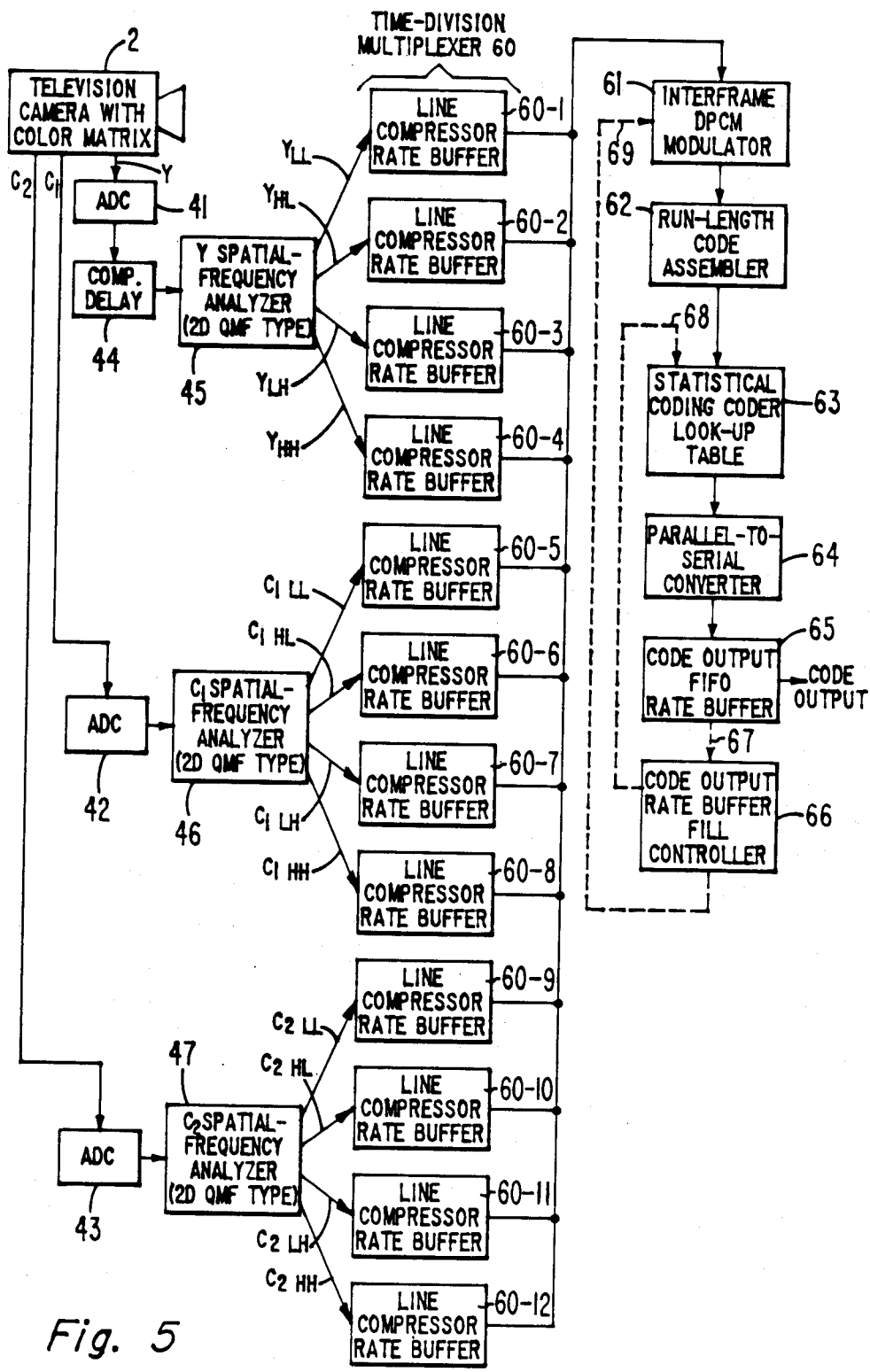
FIG. 5 is a block diagram of a coder for a sending station of the FIG. 1 system, which coder is alternative to that of FIG. 2 and embodies an aspect of the invention.

FIG. 5 shows a simplification of the FIG. 2 coder structure wherein the multiplicity of interframe DPCM modulators is replaced by a single DPCM modulator 61 operative at the fast sample rate. Consider why a single DPCM modulator 61 may satisfactorily replace DPCM modulators 48-59.

A spatial frequency analysis (in one spatial dimension) of a luminance-descriptive variable results in one or more band-pass spectra or subbands, wherein the samples may take on positive or negative values, and in a remnant low-pass spectrum or subband, wherein the samples invariably have positive values. A spatial frequency analysis (in one spatial dimension) of a color-difference-descriptive variable results in one or more band-pass subbands, wherein the samples may take on positive or negative values, and in a remnant low-pass subband, wherein the samples may take on positive or negative values. The band-pass subbands in one dimension tend to alternate sample polarities between spatially adjacent samples (which tendency is masked by the 2:1 decimation procedures used in heterodyning band-pass subbands to zero average frequency where quadrature mirror filtering procedures are followed). There is a pronounced tendency towards frame-to-frame correlation between pixel samples located at the same position in a television camera field-of-view, especially when the camera position is unaltered and there is not too much motion content in the field-of-view. Accordingly, when a DPCM signal of interframe type is applied to spatial frequency analysis in one spatial dimension, the statistics of the DPCM responses of all these types of subband signal tend to be similar, substantially more sO than the statistics of the different types of subband signal. When spatial analyses in two orthogonally disposed spatial dimensions are performed it can be shown, through somewhat more complex analysis, that the statistics of the interframe DPCM responses to each type of subband signals also tend to be similar. The statistics of the delta-frame DPCM of the subbands are sufficiently similar that they can all be statistically coded using the same coder look-up table arrangement.

Binning control signals sent via a connection 69 from fill controller 66 to DPCM modulator 61 can, however, be altered for each compressed scan line segment in its input data stream. Coder table adjustment signals from fill controller 66 to coder LUT 63 can be altered as well, to accommodate the changes in binning in the DPCM modulator 61 quantizer.

Zero stuffing will also have to be carried out on a time-division-multiplexed basis in the interframe DPCM modulator 61. Both the output value from modulator 61 to run-length code assembler 62 and the predicted value stored in the DPCM feedback connection of modulator 61 must be forced to zero when higher-spatial-frequency component scan lines are not to be transmitted.

Figure 6:
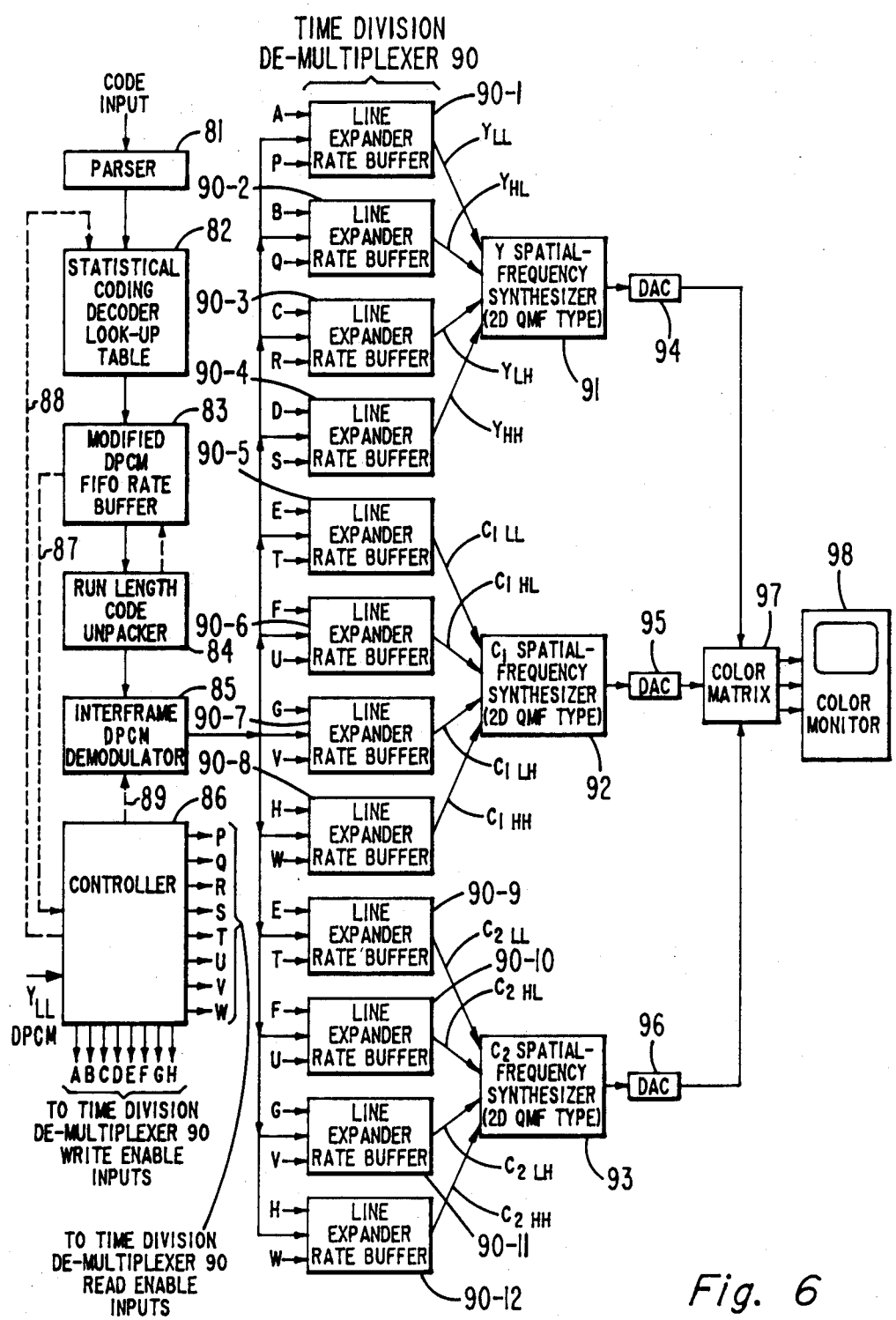
FIGS. 6 and 7 are each a block diagram of a decoder for a receiving station of the FIG. 1 system, each of which decoders embodies an aspect of the invention.

FIG. 6 shows a decoder for use in the receiving station of a digital television transmission system using a FIG. 5 coder in a sending station thereof. A code input bit stream from the code receiver (not shown) is supplied to a parser 81. Parser 81 separates the bit stream into variable-length code words, pads them to a standard bit length and then applies them as address input signal to a statistical coding decoder look-up table 82, which table is complementary to the statistical coding coder look-up table 63 in the FIG. 5 coder. The modified DPCM samples generated by look-up table 82 are fed to a first-in, first-out (FIFO) rate buffer memory 83. FIFO buffer 83 responds to instructions from a run-length code unpacker 84 to admit modified DPCM samples one at a time into the unpacker. The unpacker 84 converts the modified DPCM to a conventional interframe DPCM signal.

The interframe DPCM signal from unpacker 84 is supplied to an interframe DPCM demodulator 85, which supplies a stream of spatial-frequency analysis samples to a time-division multiplexer 90 comprising line expander rate buffers 90-1, 90-2, 90-3, 90-4, 90-5, 90-6, 90-7, 90-8, 90-9, 90-10, 90-11 and 90-12. Line expander rate buffers 90-1, 90-2, 90-3 and 90-4 supply $Y_{LL}$, $Y_{HL}$, $Y_{LH}$ and $Y_{HH}$ signals to a spatial-frequency synthesizer 91 that complements the spatial-frequency analyzer 45 and regenerates a digitized Y signal. Line expander rate buffers 90-5, 90-6, 90-7 and 90-8 supply $C_{1LL}$, $C_{1HL}$, $C_{1LH}$ and $C_{1HH}$ signals to a spatial-frequency synthesizer 92 that complements the spatial-frequency analyzer 46 and regenerates a digitized $C_1$ signal. Line expander rate buffers 90-9, 90-10, 90-11 and 90-12 supply $C_{2LL}$, $C_{2HL}$, $C_{2LH}$ and $C_{2HH}$ signals to a spatial-frequency synthesizer 93 that complements the spatial-frequency analyzer 47 and regenerates a digitized $C_2$ signal.

Each of the spatial-frequency synthesizers 91, 92 and 93 includes a plurality of spatial-frequency interpolators for resampling the subband component signals supplied to its input to the full sampling rate for its respective output signal Y, $C_1$ or $C_2$. A way to perform this resampling, which is known to those skilled in the art, is as follows. A first step is inserting zero-valued null samples into sample positions in the expanded spatial matrix of each subband which positions are not filled by corresponding actual samples from the sparser spatial matrix of the subband. This first step is a spatial-frequency carrier modulation process that generates low-pass and band-pass spatial-frequency spectra. A second step is to use filtering to suppress the unwanted spectrum generated by the first step. (This filtering is quadrature mirror filtering in the case where the coder spatial-frequency analyzers used quadrature mirror filtering to perform spatial analysis.) A third step is to add together the interpolation results from the second step, which results have similar sampling densities. Where spatial-frequency synthesis of signals subjected to pyramid reduction during spatial-frequency analysis is sought, the foregoing procedure is reiterated.

The spatial-frequency synthesizer 92 includes further steps of spatial interpolation for resampling the synthesized $C_1$ signal to have the same number of scan lines as synthesized Y signal. Similarly, the spatial-frequency synthesizer 93 includes further steps of spatial interpolation for resampling the synthesized $C_2$ signal to have the same number of scan lines as synthesized Y signal. It is convenient to perform these further spatial interpolations in two dimensions—i.e., horizontally as well as vertically—particularly if one elects to do color matrixing of the synthesized Y, $C_1$ and $C_2$ signals digitally. The compensating delay 44 in the coder can take into account the delay involved in these further spatial interpolations of $C_1$ and $C_2$ signals. (While embodiments of the invention are described wherein delay compensation of Y is solely in the coder, in other embodiments of the invention delay compensation may be effected in the decoder instead, or may be apportioned between the coder and decoder.)

Digital-to-analog converters 94, 95 and 96 convert the regenerated digitized Y, $C_1$ and $C_2$ signals to analog Y, $C_1$ and $C_2$ signals that are supplied to a color matrixing circuitry 97. Color matrixing circuitry 97 responds to the analog Y, $C_1$ and $C_2$ signals to supply red (R), green (G) and blue (B) drive signals to a color monitor receiver 98. Color monitor receiver 98 also receives synchronization and sound signals from parts of the decoder not shown in FIG. 6.

(Alternatively, color matrixing˙ may be done in the digital realm by linearly combining the digital Y, $C_1$ and $C_2$ signals from spatial frequency synthesizers 91, 92 and 93 to generate digital R, G and B signals. Then, the digital R, G and B signals are converted to analog R, G and B signals for application to color monitor receiver 98 with appropriate digital to analog converters. Color matrixing in the analog realm is preferable in that color saturation adjustments are simpler to make, not requiring fast digital multipliers.)

A controller 86 decodes certain codes loaded into rate buffer 83, synchronizing codes which describe beginning or end of frame, synchronizing codes which describe beginning or end of scan line, other synchronizing codes where used, and codes that indicate what coding strategy was followed by the coder. These codes are supplied to controller 86 via a connection 87. Controller 86 responds to the synchronizing codes to time the sequence of write enable signals A,B,C,D,E,F,G,H and the sequence of read enable signals P,Q,R,S,T,U,V,W controller 86 transmits to the RAMS in the line-expander rate buffers of time-division demultiplexer 90. Controller 86 supplies control signal to decoder LUT 82 via a connection 88 to modify its operating characterstics if controller 86 receives a code from frame rate buffer 83 indicating that similar action was taken in the coder to modify the operating characteristics of the coder LUT 63.

Controller 86 decodes any zero-stuffing instruction received from rate buffer 83 to send instructions via a connection 89 to DPCM demodulator 85 causing circuitry within demodulator 85 to stuff zero predicted values into appropriate segments of the predicted signal stored within demodulator 85 and to force demodulator 85 output signal to have zero values.

Figure 7:
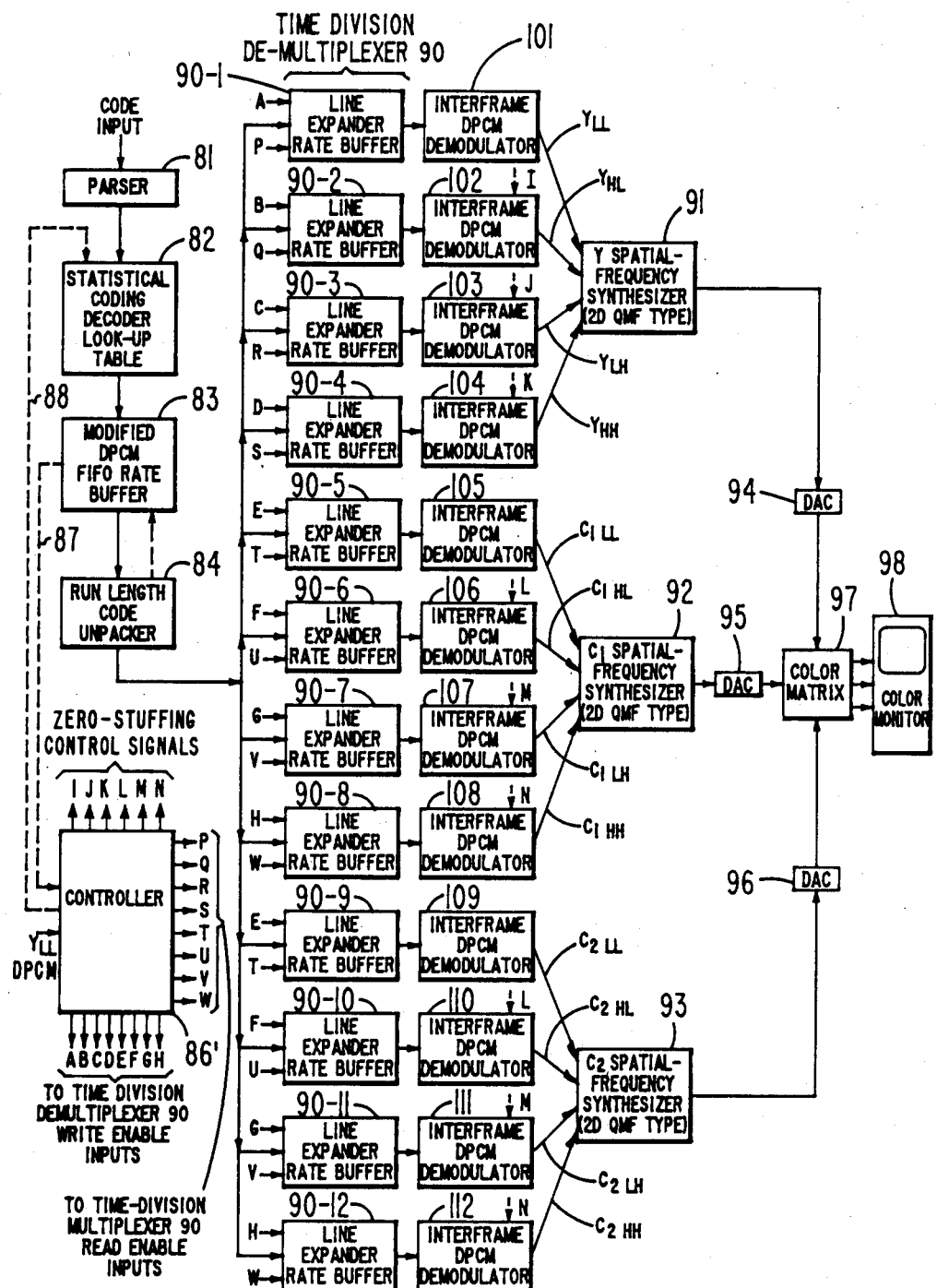

FIG. 7 decoder is illustrative of modifications that may be made in the FIG. 6 decoder to reduce DPCM demodulator sampling rates. Performing DPCM demodulation following the line-expander rate buffers 90-1 through 90-12 in time-division demultiplexer 90, rather than before time-division demultiplexer 90 can reduce the sample rate at which DPCM demodulation takes place. In the FIG. 7 decoder, interframe DPCM signal from run-length code unpacker 84 is applied directly as input signal to the time-division demultiplexer 90. DPCM demodulation to regenerate $Y_{LL}$, $Y_{HL}$, $Y_{LH}$ and $Y_{HH}$ signals for application to Y spatial frequency synthesizer 91 is done by interframe DPCM demodulators 101–104, which operate at one-half the full Y sampling rate rather than the full Y sampling rate. (Since $Y_{LL}$ and $Y_{HL}$ are interleaved on alternate scan lines with $Y_{LH}$ and $Y_{HH}$, two interframe DPCM demodulators properly time-division-multiplexed at scan line rate can be used to replace the four DPCM demodulators 101–104, if one so desires.) Similarly, regeneration of $C_{1LL}$, $C_{1HL}$, $C_{1LH}$ and $C_{1HH}$ signals for application to $C_1$ spatial-frequency synthesizer 92 is done by interframe DPCM demodulators 105–108, which operate at one-half the full $C_1$ sampling rate; and regeneration of $C_{2LL}$, $C_{2HL}$, $C_{2LH}$ and $C_{2HH}$ signals for application to $C_2$ spatial-frequency synthesizer 93 is done by interframe DPCM demodulators 109–112, which operate at one-half the full $C_2$ sampling rate. Since full $C_1$ and $C_2$ sampling rates are one-quarter or so full Y sampling rate, DPCM demodulation of the $C_1$-related and $C_2$-related signals is less likely to present a problem with regard to sampling rates in the DPCM demodulation being high.

If interframe DPCM demodulator sample rates being high still presents problems, one can take the following measures. The problem of reducing DPCM demodulator rate for Y can be solved by resolving each of $Y_{LL}$, $Y_{HL}$, $Y_{LH}$ and $Y_{HH}$ into a respective pair of lower-spatial-frequency and upper-spatial-frequency subbands using quadrature mirror filtering in the horizontal dimension. This can be done at the sending station or can be done using the output signals from the rate buffers 90-1, 90-2, 90-3 and 90-4. The additional delay introduced by this processing must be compensated for in the $C_1$ and $C_2$ channels, naturally. The eight Y-descriptive subbands can then be demodulated at one-quarter full sampling rate. Interframe DPCM demodulation sample rates can be further reduced by similar action was taken in the coder to modify the operating characteristics of the coder LUT 63.

Controller 86 decodes any zero-stuffing instruction received from rate buffer 83 to send instructions via a connection 89 to DPCM demodulator 85 causing circuitry within demodulator 85 to stuff zero predicted values into appropriate segments of the predicted signal stored within demodulator 85 and to force demodulator 85 output signal to have zero values.

FIG. 7 decoder is illustrative of modifications that may be made in the FIG. 6 decoder to reduce DPCM demodulator sampling rates. Performing DPCM demodulation following the line-expander rate buffers 90-1 through 90-12 in time-division demultiplexer 90, rather than before time-division demultiplexer 90 can reduce the sample rate at which DPCM demodulation takes place. In the FIG. 7 decoder, interframe DPCM signal from run-length code unpacker 84 is applied directly as input signal to the time-division demultiplexer 90. DPCM demodulation to regenerate $Y_{LL}$, $Y_{HL}$, $Y_{LH}$ and $Y_{HH}$ signals for application to Y spatial frequency synthesizer 91 is done by interframe DPCM demodulators 101–104, which operate at one-half the full Y sampling rate rather than the full Y sampling rate. (Since $Y_{LL}$ and $Y_{HL}$ are interleaved on alternate scan lines with $Y_{LH}$ and $Y_{HH}$, two interframe DPCM demodulators properly time-division-multiplexed at scan line rate can be used to replace the four DPCM demodulators 101–104, if one so desires.) Similarly, regeneration of $C_{1LL}$, $C_{1HL}$, $C_{1LH}$ and $C_{1HH}$ signals for application to $C_1$ spatial-frequency synthesizer 92 is done by interframe DPCM demoduators 105–108, which operate at one-half the full $C_1$ sampling rate; and regeneration of $C_{2LL}$, $C_{2HL}$, $C_{2LH}$ and $C_{2HH}$ signals for application to $C_2$ spatial-frequency synthesizer 93 is done by interframe DPCM demodulators 109–112, which operate at one-half the full $C_2$ sampling rate. Since full $C_1$ and $C_2$ sampling rates are one-quarter or so full Y sampling rate, DPCM demodulation of the $C_1$-related and $C_2$-related signals is less likely to present a problem with regard to sampling rates in the DPCM demodulation being high.

If interframe DPCM demodulator sample rates being high still presents problems, one can take the following measures. The problem of reducing DPCM demodulator rate for Y can be solved by resolving each of $Y_{LL}$, $Y_{HL}$, $Y_{LH}$ and $Y_{HH}$ into a respective pair of lower-spatial-frequency and upper-spatial-frequency subbands using quadrature mirror filtering in the horizontal dimension. This can be done at the sending station or can be done using the output signals from the rate buffers 90-1, 90-2, 90-3 and 90-4. The additional delay introduced by this processing must be compensated for in the $C_1$ and $C_2$ channels, naturally. The eight Y-descriptive subbands can then be demodulated at one-quarter full sampling rate. Interframe DPCM demodulation sample rates can be further reduced by repeating this subbanding procedure in the vertical dimension. If the subbanding of Y-descriptive signals is carried out to where the subband samples are more sparsely sampled in the horizontal direction than $C_1$ and $C_2$ samples, interframe DPCM demodulation to recover $C_1$ and $C_2$ will also have to proceed at lower rates. To do this, the procedures for reducing the rates of demodulation to recover Y that are described above can be followed for recovering $C_1$ and $C_2$.

The FIG. 7 decoder also differs from the FIG. 6 decoder in that the zero-stuffing procedures to accommodate the omission of high spatial frequency components in areas of interframe change takes place in the interframe DPCM demodulators 102–104 for Y, 106–108 for $C_1$ and 110–112 for $C_2$. More particularly, zeroes are stuffed into the respective memory for predicted values for each of the demodulators 102–104 for Y, 106–108 for $C_1$ and 110–112 for $C_2$, and the output signals of these demodulators are also forced to zero. These zero stuffing procedures are carried out responsive to zero-stuffing commands, I,J,K,L,M and N issued by controller 86'.

Thusfar, in describing the operations of the FIG. 5 coder and FIG. 6 decoder, the reading from the line compressor rate buffers 60-1 to 60-4 and the writing into the line expander rate buffers 90-1 to 90-4 have been time-division multiplexed strictly on a per scan line basis. Similar procedure has been escribed for line compressor rate buffers 60-5 to 60-8, for line expander rate buffers 90-5 to 90-8, for line compressor rate buffers 60-9 to 60-12 and for line expander rate buffers 90-9 to 90-12. A different way of performing these portions of the time-division multiplexing is preferred because it leads to longer runs of zero values at the output of DPCM modulator 61 and thus provides greater compression in coding. Rather than concatenating the compressed scan lines of the subbands in the FIG. 5 time-division-multiplexed 60 output signal, the corresponding compressed scan lines of each subband component of Y, $C_1$ or $C_2$ are sequentially polled one pixel sample from each line, advancing one pixel in each line after it is polled. This procedure interleaves the subband scan lines on a per pixel basis resulting in a scan line of composite subband signal had with as many samples as the line of original video signal had before its being subjected to subbanding. Samples close to each other in the composite subband signal concern the same pixel or side-by-side pixels in the original video signal. So non-zero DPCM signal values caused by interframe changes tend to clump together rather than appearing separated by compressed scan line time intervals in modulator 61. In the FIG. 6 decoder the writing of the line expander rate buffers 90-1 to 90-4 in time-division multiplexer 90 is done cyclically at pixel rate. So is the writing of the line expander rate buffers 90-5 to 90-8, and so is the writing of the line expander rate buffers 90-9 to 90-12.

Where Y is subbanded, so its subbands are sampled in the horizontal direction at the same density as $C_1$ and $C_2$, or at the same density as subbands $C_1$ and $C_2$, the concept of arranging samples to clump together non-zero DPCM samples can be carried even further. More sophisticated rate buffer circuitry in the coder and decoder time-division multiplexers permits Y, $C_1$ and $C_2$ samples descriptive of the same portion of the image to be located close to each in the digital sample stream supplied to the interframe DPCM modulator. All the subband signals in a block of image data (i.e. in a cycle of time-division multiplexer operation) have the same number of samples per compressed scan line and can be polled sequentially to generate the digital data stream supplied to the coder differential pulse code modulator. In the decoder the differential pulse code demodulator is followed by time-division demultiplexing that is complementary to the time-division multiplexing in the coder.

Figure 8:
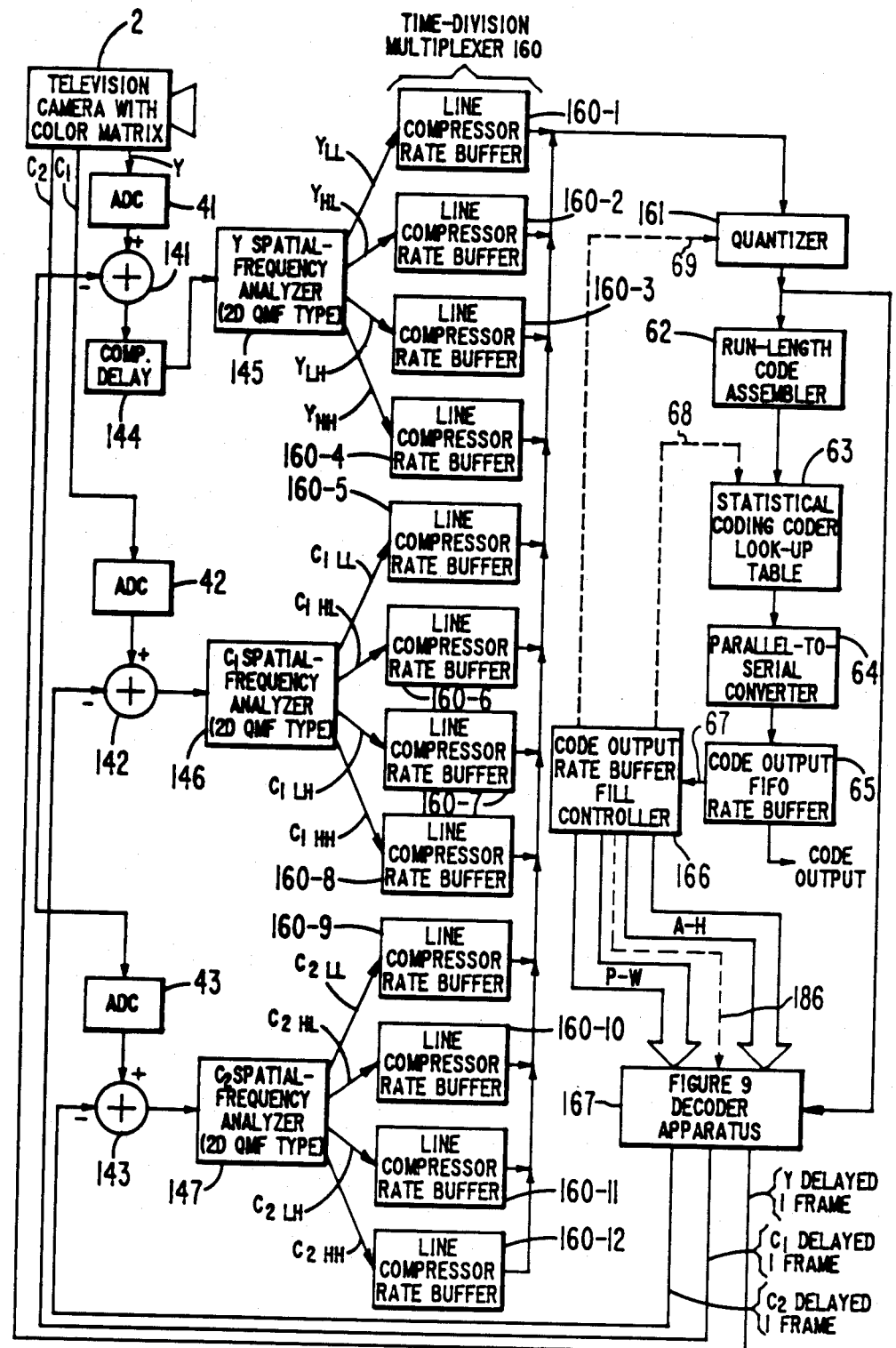
FIG. 8 is a block diagram of another coder embodying an aspect of the invention.

FIG. 8 shows a coder in which the spatial-frequency analyzers of the sending station and spatial-frequency synthesizers like those in the receiving station(s) are included in the predictor portion of the sending station DPCM modulator. The digitizer Y signal from analog to digital converter 41 is supplied to the minuend input port of a subtractor 141 to have subtracted therefrom a value of Y predicted from the previous frame, which predicted value is applied to the subtrahend input port of subtractor 141. The Y interframe error signal appearing at the difference output port of subtractor 141 is subjected to compensation delay 144 analogous to compensation delay 44 in the FIG. 5 coder insofar as duration of delay is concerned, and the delayed error signal is supplied to the Y spatial-frequency analyzer 145. Spatial-frequency analyzer 145 differs from the Y spatial-frequency analyzer of the FIG. 5 coder in that it processes interframe errors in Y rather than Y itself. Analogously spatial-frequency analyzers 146 and 147 process interframe errors in $C_1$ and in $C_2$, respectively, as furnished from the difference output ports of subtractors 142 and 143, respectively.

Time division multiplexer 160 operates analogously to time-division multiplexer 60 of the FIG. 5 coder except that it operates on interframe errors in Y, $C_1$ and $C_2$. The time-division-multiplex output signal from multiplexer 160 is supplied to a quantizer 161, the response from which is the differential pulse code modulator output signal supplied to the run-length code assembler 62. Elements 62-65 operate analogously to correspondingly numbered elements in the FIG. 5 coder. A code output rate buffer fill controller 166 incorporates within itself all the functions of controller 66 in the FIG. 5 coder and some of the functions of the FIG. 6 controller 86, as will be explained further on.

The code output rate buffer 65 in the FIG. 8 coder delivers code output for transmission to a decoder that is like portions of the FIG. 6 decoder. Supposing controllers 166 and 86 cooperate correctly, there is no amplitude quantizing error introduced in elements 62-65 of the FIG. 8 coder or in the elements 81-84 of the FIG. 6 decoder so, absent transmission errors, the output signal from the run length code unpacker 84 of the FIG. 6 decoder should be identical to the output signal from quantizer 161. Accordingly, elements 62-65 and elements modelling elements 81-84 are omitted from the feedback connections forming the predictor portion of the FIG. 8 differential pulse code modulator. Quantizer 161 output signal goes to an apparatus 167 that provides DPCM demodulation of that signal; demultiplexes the demodulated signal to separate out subband spectra; supplies the subband spectra to spatial-frequency synthesizers for regenerating the Y, $C_1$ and $C_2$ signals; and delays the regenerated Y, $C_1$ and $C_2$ signals to be prediction signals for application to the subtrahend input ports of subtractors 141, 142 and 143, respectively.

Figure 9:
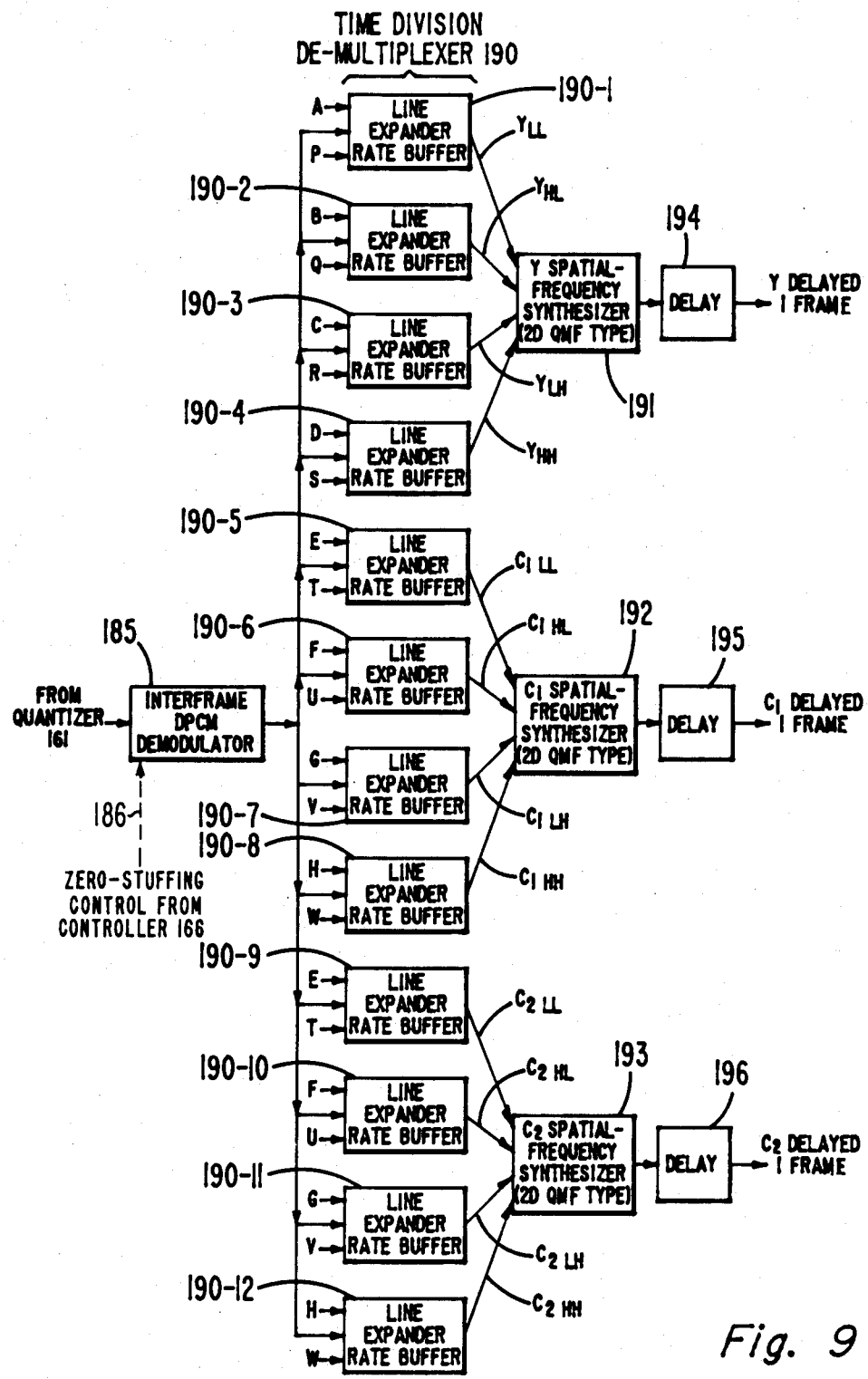
FIG. 9 is a block diagram showing in detail a portion of the FIG. 8 coder.

FIG. 9 shows in some detail the construction of the FIG. 8 apparatus 167, which is analogous to some portions of the FIG. 6 decoder. An interframe DPCM demodulator 185 that is analogous to demodulator 85 in the FIG. 6 decoder responds to interframe DPCM signal from quantizer 161 to recover interleaved subband samples of Y, $C_1$ and $C_2$. A time-division de-multiplexer 190 that is analogous to the time-division de-multiplexer 90 of the FIG. 6 decoder is used to separate the Y-descriptive subbands from which Y spatial-frequency synthesizer 191 regenerates delayed Y signal, the $C_1$-descriptive subbands from which $C_1$ spatial-frequency synthesizer 192 regenerates delayed $C_1$ signal, and the $C_2$-descriptive subbands from which $C_2$ spatial-frequency synthesizer 193 regenerates delayed $C_2$ signal. Synthesizers 191, 192 and 193 are similar in structure to synthesizers 91, 92 and 93, respectively, of the FIG. 6 decoder. A digital delay line 194 augments the delay of the Y signal recovered by Y spatial-frequency synthesizer 191, so it is one frame later in time than the Y signal supplied to subtractor 141 from the analog-to-digital converter 41. A digital delay line 195 augments the delay of the $C_1$ signal recovered by $C_1$ spatial-frequency synthesizer 192, so it is one frame later in time than the $C_1$ signal supplied to subtractor 142 from the analog-to-digital converter 42. A digital delay line 196 augments the delay of the $C_2$ signal recovered by the $C_2$ spatial-frequency synthesizer 193, so it is one frame later in time than the $C_2$ signal supplied to subtractor 143 from the analog-to-digital converter 43.

Application of the recovered Y, $C_1$ and $C_2$ signals to the subtrahend input ports of subtractors 141, 142 and 143, respectively, closes the differential pulse code modulation loop in the FIG. 8 coder. The write control signals A-H for rate buffers 190-1 through 190-12 and their read control signals P-W are generated by fill controller 166. This is done proceeding from quantizer 161 output signal in a manner analogous to that of controller 86 in the FIG. 6 decoder.

Fill controller 166 also controls zero-stuffing procedures when higher-spatial-frequency components of the Y, $C_1$ and $C_2$ signals are not to be described in the code output from the FIG. 8 coder. When a high-spatial-frequency component is to be omitted, fill controller 166 directs a widening of the zero range bin in quantizer 161 so all output samples of the scan lines of the suppressed higher spatial frequency components are zero-valued in quantizer 161 output signal. Fill controller 166 also sends a control signal via a connection 186 to the interframe DPCM demodulator 185 in the decoder apparatus 167 used in closing the interframe DPCM modulator loop, which control signal directs the zero-stuffing procedure in the interframe DPCM demodulator 185 wherein both the output signal and the predicted signal to be delayed a frame are forced to zero value.

One may modify the FIG. 8 coder by replacing decoder apparatus 167 with decoder apparatus of the following type. Quantizer 161 output signal is supplied to a time-division multiplexer like 90 of FIG. 7 for apportionment to interframe DPCM demodulators like 101-112 of FIG. 7. The subbands from these demodulators are apportioned to spatial-frequency synthesizers like 91-93 of FIG. 7. The Y, $C_1$, and $C_2$ signals regenerated by the spatial-frequency synthesizers are delayed to be one frame later in time than the Y, $C_1$ and $C_2$ signals involved in their origination and are applied to the subtrahend input ports of subtractors 141, 142 and 143, respectively. Variants of the FIG. 8 coder where the analog to digital converters 41, 42, 43 are included in the DPCM loop are possible.

Embodiments of the invention are possible which use a somewhat different type of zero-stuffing technique than that thusfar described to reduce the amount of high-spatial-frequency detail lost in portions of the televised picture not exhibiting interframe change. In this different technique the low-spatial-frequency component of Y error signal (i.e. $Y_{LL}$ DPCM signal) is threshold detected, both in the encoder at the sending station and in the decoder at the receiving station, to detect the larger values of Y error signal indicative of areas of interframe pixel change. In these areas the predicted values of pixel high-spatial-frequency component samples from the previous frame are likely to be in error and zeroes are stuffed into their stead in the differential-pulse-code-modulator and differential-pulse-code-demodulator memories for predicted values. In areas where interframe change is not detected, zero-stuffing to replace these samples is not done, so high-spatial-frequency detail is retained. This alternative zero-stuffing procedure allows one to take better advantage of the fact that higher spatial frequencies are not resolved as well either temporally or spatially as lower spatial frequencies in areas where motion occurs in a sequence of image frames.

Embodiments of the invention are possible in which only the luminance component of visible light is digitally transmitted. Embodiments of the invention are possible in which the camera senses infrared spectral energy or ultraviolet energy instead of or in addition to visible light energy.

Embodiments of the invention are possible wherein look-ahead techniques are used to affect coding procedures. Embodiments of the invention are possible where the coding procedure to be followed is symbol coded, this being done outside the run-length coding procedure to develop modified DPCM.

What is claimed is:

1. Improved sending apparatus for a digitally televised sequence of image frames described by a plurality of component video signals, which sending apparatus is of the type including means for interframe differential pulse code modulation (DPCM) of said component video signals, means for run length encoding of zero value samples from said DPCM modulated signals and means for statistical coding of the run length codes and of non zero value samples of said modulated and run length encoded signals, wherein the improvement comprises means for time division multiplexing said component video signals together prior to said differential pulse code modulation, run length encoding and statistical coding procedures.

2. Improved sending apparatus as set forth in claim 1 wherein said means for time division multiplexing includes means for multiplexing on a per scan line basis.

3. Improved sending apparatus as set forth in claim 1 wherein said means for time division multiplexing includes means for interleaving together on a per pixel basis scan lines of different component video signals that are at least substantially spatially corresponding.

4. Improved sending apparatus for a digitally televised sequence of image frames described by a plurality of component video signals, which sending apparatus is of the type using interframe differential pulse code modulation (DPCM) of said component video, signals followed by statistical coding said improved sending apparatus comprising:
    means responsive to each of at least one digital video signal descriptive of a sequence of image frames for performing a spatial frequency analysis thereof thereby to generate for each said digital video signal a respective set of subband signals, at least some of which subband signals in each set are generated at a lower sampling rate than the digital video siqnal used to generate them;
    a differential pulse code modulator for generating a differential pulse code modulation (DPCM) signal of interframe type from each subband signal;
    a time division multiplexer for interleaving lines of said differential pulse code modulation signals of interframe type together in time, thereby to form a digital sample stream; and
    a symbol coder for generating symbol codes descriptive of samples in said digital sample stream.

5. Sending apparatus as set forth in claim 4 wherein said means for performing spatial-frequency analysis performs analyses on a relatively wideband digital video signal descriptive of luminance variations in said sequence of image frames and on two lesser bandwidth digital video signals for completing a full color description of said sequence of image frames.

6. Improved sending apparatus as set forth in claim 4 wherein said DPCM generates zero run length and non zero value samples, said symbol coder includes:
    means for run length encoding at least zero value sample runs in said sample stream thereby to generate modified DPCM signal; and
    a look up table for statistically coding said modified DPCM to generate said symbol codes.

7. A method for broadcasting sequences of image frames using the sending apparatus of claim 4, said method comprising the steps of:
    generating said at least one digital video signal relying on a television camera source;
    applying each said at least one video signal to the sending apparatus of claim 4; and
    sending said symbol codes over a broadcast transmission medium.

8. Receiving apparatus for symbol codes describing a digitally televising sequence of image frames, said receiving apparatus comprising:
    a symbol decoder for generating a sample stream of differential pulse code modulation (DPCM) signal of interframe type from said symbol codes;
    a time-division demultiplexer for separating said digital sample stream into respective subband signals that are differential pulse code modulated respective components of spatial-frequency analyses of each of at least one digital video signal descriptive of successive image frames in said sequence;
    a respective interframe DPCM decoder for each said subband signal to recover the spatial-frequency analysis component and
    means responsive to the respective spatial-frequency analysis of each of said at least one digital video signal for synthesizing that digital video signal.

9. Receiving apparatus as set forth in claim 8 wherein said symbol decoder includes
    a look-up table for converting symbol codes to a stream of non-zero-valued samples and run-length codes for zero-value samples runs in said DPCM signal; and
    means responsive to said run-length codes for interspersing runs of zero-value samples among non-zero-valued samples to recover said DPCM signal.

10. Improved sending apparatus for a digitally televised sequence of image frames described by a plurality of component video signals, which sending apparatus is of the type including means for interframe differential pulse code modulation of said component video signals, followed by means for run length encoding of zero value samples, followed by means for statistical coding of run length codes and of non zero value samples, wherein the improvement comprises means for time division multiplexing the differential pulse code modulation response of said component video signals prior to said statistical coding procedures.

11. Improved sending apparatus as set forth in claim 10 wherein said means for time division multiplexing includes means for time division multiplexing on a per scan line basis.

12. Improved sending apparatus as set forth in claim 10 wherein said means for time division multiplexing includes means for interleaving together on a per pixel basis scan lines of different component video signals that are at least substantially spatially corresponding.

13. Improved sending apparatus as set forth in claim 10, said sending apparatus comprising:
    means responsive to each of at least one digital video signal descriptive of sequence of image frames for performing a spatial frequency analysis thereof thereby to generate for each said ditial video signal a receptive set of subband signals, at least some of which subband signals in each set are generated at a lower sampling rate than the digital video signal used to generate them;

said means for time division multiplexing including means for interleaving lines of said subband signals together in time, thereby to form a digital sample stream;

said means for differential pulse code modulation generating a differential pulse code modulation (DPCM) signal of interframe type from said digital sample stream; and said means for statistical coding including a symbol coder for generating symbol codes descriptive of samples in said digital sample stream.

14. Sending apparatus as set forth in claim 13 wherein said means for performing spatial-frequency analysis includes means for performing analyses on a relatively wideband digital video signal descriptive of luminance variations in said sequence of image frames and on two lesser bandwidth digital video signals for completing a full color description of said sequence of image frames.

15. Sending apparatus as set forth in claim 13 wherein said symbol coder includes:

means for run-length encoding at least zero-value sample runs in said sample stream, thereby to generate modified DPCM signal; and a look-up table for statistically coding said modified DPCM signal to generate said symbol codes.

16. A system for digitally televising sequences of image frames comprising the sending apparatus set forth in claim 13 and at least one receiving apparatus linked to said sending apparatus by a digital transmission link; said at least one receiving apparatus comprising:

a symbol decoder for generating a differential pulse code modulation (DPCM) signal of interframe type from said symbol codes;

a DPCM decoder for generating from said DPCM signal a digital sample stream comprising interleaved lines of subband signals in said sequence;

a time-division demultiplexer for separating said digital sample stream into respective subband signals providing spatial-frequency analyses of each of at least one digital video signal descriptive of successive image frames in said sequence; and means responsive to the respective spatial-frequency analysis of each of said at least one digital video signal for synthesizing that digital video signal.

17. A method for broadcasting sequences of image frames using the improved sending apparatus of claim 13, said method comprising the steps of:

generating said at least one digital video signal relying on a television camera source;

applying each said at least one video signal to the improved sending apparatus of claim 13; and sending said symbol codes over a broadcast transmission medium.

18. Receiving apparatus for symbol codes describing a digitally televised sequence of image frames, said receiving apparatus comprising:

a symbol decoder for generating a differential pulse code modulation (DPCM) signal of interframe type from said symbol codes;

an interframe DPCM decoder for generating from said DPCM signal a digital sample stream comprising interleaved subband signals in said sequence;

a time-division demultiplexer for separating said digital sample stream into respective subband signals providing spatial-frequency analyses of each of at least one digital video signal descriptive of successive image frames in said sequence; and means responsive to the respective spatial-frequency analysis of each of said at least one digital video signal for synthesizing that digital video signal.

19. Receiving apparatus as set forth in claim 18 wherein said symbol decoder includes:

a look-up table for converting symbol codes to a stream of non-zero-valued samples in said DPCM signal and run-length codes for zero-value sample runs in said DPCM signal; and means responsive to said run-length codes for interspersing runs of zero-value samples among non-zero-valued samples to recover said DPCM signal.

20. Receiving apparatus as set forth in claim 18 wherein said at least one digital video signal comprise a relatively wideband luminance video signal and two relatively narrowband chrominance video signals.

21. Receiving apparatus for symbol codes describing a digitally televised sequence of image frames, said receiving apparatus comprising:

a symbol decoder for generating a composite differential pulse code modulation (DPCM) signal of interframe type from said symbol codes;

a time-division demultiplexer for separating said composite DPCM signal of interframe type into component DPCM signals of interframe type descriptive of respective subband signals providing spatial-frequency analyses of at least one digital video signal descriptive of successive image frames in said sequence;

a respective DPCM decoder for generating from each component DPCM signal of interframe type said respective subband signals; and means responsive to the respective spatial-frequency signal for synthesizing that digital video signal.

22. Receiving apparatus as set forth in claim 21 wherein said symbol decoder includes:

a look-up table for converting symbol codes to a stream of non-zero-valued samples in said DPCM signal and run-length codes for zero-value sample runs in said DPCM signal; and means responsive to said run-length codes for interspersing runs of zero-value samples among non-zero-valued samples to recover said DPCM signal.

23. Receiving apparatus as set forth in claim 21 wherein said at least one digital video signal comprise a relatively wideband luminance video signal and two relatively narrowband chrominance video signals.

24. Sending apparatus for a digitally televised sequence of image frames, said sending apparatus comprising:

a number at least one of subtractors, each having a respective minuend input port receptive of a respective digital video signal descriptive of a sequence of image frames, each having a respective subtrahend input port receptive of a prediction signal for the respective digital video signal received at its respective minuend input port, and each having a respective difference output port for supplying a respective digital error signal;

means responsive to each said digital error signal descriptive of a sequence of image frames for performing a spatial-frequency analysis thereof thereby to generate for each said digital error signal a respective set of subband signals, at least some of which subband signals in each set are generated at a lower sampling rate than the digital video signal used to generate them;

means for generating from said subband signals digital pulse code modulation responses time-division multiplexed together in a digital sample stream;

a quantizer responding to said digital sample stream to generate a more coarsely quantized digital sample stream:

a symbol coder for qenerating, as an output signal from said sending apparatus, symbol codes descriptive of said more coarsely quantized digital sample stream; and apparatus for generating from said more coarsely quantized digital sample stream respective predicted values for each said subtractor respective subtrahend input port.

25. Sending apparatus as set forth in claim 24 wherein said apparatus for generating a respective prediction signal for each said subtractor respective subtrahend input port includes:

an interframe differential pulse code demodulator for demodulating said more coarsely quantized digital sample stream from said quantizer to generate a time-division multiplexed signal containing a respective set of subband signals descriptive of each said digital video signal;

a spatial-frequency synthesizer for each said respective set of subband signals;

a time-division demultplexer for separating, from said time-division multiplexed signal supplied by said demodulator, the respective set of subband signals applied to each said spatial-frequency synthesizer for causing a synthesized digital video signal therefrom; and means for delaying each synthesized digital video signal to generate a respective said prediction signal.

* * * * *